United States Patent
Park

(10) Patent No.: US 10,747,357 B2
(45) Date of Patent: *Aug. 18, 2020

(54) COORDINATE MEASURING APPARATUS FOR MEASURING INPUT POSITION OF A TOUCH AND A COORDINATE INDICATING APPARATUS AND DRIVING METHOD THEREOF

(71) Applicant: Samsung Electronics Co., Ltd., Gyeonggi-do (KR)

(72) Inventor: Sung-soo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,426

(22) Filed: Jan. 23, 2019

(65) Prior Publication Data

US 2019/0155444 A1 May 23, 2019

Related U.S. Application Data

(63) Continuation of application No. 15/267,940, filed on Sep. 16, 2016, now Pat. No. 10,209,816, which is a
(Continued)

(30) Foreign Application Priority Data

Jul. 4, 2013 (KR) .................. 10-2013-0078176
Jul. 22, 2016 (KR) .................. 10-2016-0093257

(51) Int. Cl.
*G06F 3/041* (2006.01)
*G06F 3/044* (2006.01)
(Continued)

(52) U.S. Cl.
CPC .......... *G06F 3/0416* (2013.01); *G06F 3/0383* (2013.01); *G06F 3/03545* (2013.01);
(Continued)

(58) Field of Classification Search
CPC ..................................................... G06F 3/0416
(Continued)

(56) References Cited

U.S. PATENT DOCUMENTS 7,903,094 B2 3/2011 Katsuhito et al.
8,373,677 B2 2/2013 Perski et al.
(Continued)

FOREIGN PATENT DOCUMENTS

EP 2 325 736 5/2011
JP 5133372 1/2013
(Continued)

OTHER PUBLICATIONS

International Search Report dated Dec. 7, 2016 issued in counterpart application No. PCT/KR2016/010352, 9 pages.
(Continued)

*Primary Examiner* — Long D Pham
(74) *Attorney, Agent, or Firm* — The Farrell Law Firm, P.C.

(57) ABSTRACT

A coordinate measuring apparatus and a method of controlling the same are provided. The coordinate measuring apparatus includes a touch panel comprising a plurality of electrodes, a driver configured to generate a driving signal and to provide the driving signal to the touch panel, a receiver configured to receive from the touch panel a first receiving signal and a second receiving signal corresponding to a signal transmitted from a coordinate indicating apparatus, and a processor configured to identify a form of a user's grip on the coordinate indicating apparatus based on the first receiving signal, and identify an activation region and a deactivation region of the touch panel based on the identified form of the user's grip and the second receiving signal.

14 Claims, 24 Drawing Sheets

Related U.S. Application Data continuation-in-part of application No. 14/322,457, filed on Jul. 2, 2014, now Pat. No. 9,927,938.

(60) Provisional application No. 62/220,519, filed on Sep. 18, 2015.

(51) Int. Cl.
*G06F 3/046* (2006.01)
*G06F 3/0354* (2013.01)
*G06F 3/038* (2013.01)

(52) U.S. Cl.
CPC .............. *G06F 3/044* (2013.01); *G06F 3/046* (2013.01); *G06F 3/0412* (2013.01); *G06F 2203/04101* (2013.01); *G06F 2203/04104* (2013.01); *G06F 2203/04106* (2013.01)

(58) Field of Classification Search
USPC ........................................................ 345/174
See application file for complete search history.

(56) References Cited

U.S. PATENT DOCUMENTS

| | | | |
|---|---|---|---|
| 10,209,816 B2 * | 2/2019 | Park | G06F 3/0416 |
| 2008/0042985 A1 | 2/2008 | Katsuhito | |
| 2011/0310034 A1 | 12/2011 | Ouchi | |
| 2012/0007618 A1 | 1/2012 | Yeh et al. | |
| 2012/0013555 A1 | 1/2012 | Maeda et al. | |
| 2012/0262407 A1 | 10/2012 | Hinckley et al. | |
| 2012/0313865 A1 | 12/2012 | Pearce | |
| 2013/0300672 A1 | 11/2013 | Griffin | |
| 2013/0321334 A1 | 12/2013 | Yoshida | |
| 2014/0022193 A1 | 1/2014 | Kim et al. | |
| 2014/0043283 A1 | 2/2014 | Kim | |
| 2014/0092045 A1 | 4/2014 | Ananthapadmanabh et al. | |
| 2014/0111472 A1 | 4/2014 | Lee et al. | |
| 2015/0009161 A1 | 1/2015 | Park | |
| 2015/0177870 A1 | 6/2015 | Nicholson et al. | |
| 2015/0363034 A1 * | 12/2015 | Hinckley | G06F 3/04883 345/173 |

FOREIGN PATENT DOCUMENTS

| | | |
|---|---|---|
| JP | 2014209291 | 11/2014 |
| KR | 20100053093 | 5/2011 |
| KR | 20120003766 | 1/2012 |
| KR | 20120044718 | 5/2012 |
| KR | 1020150005020 | 1/2015 |
| KR | 1020150008993 | 1/2015 |

OTHER PUBLICATIONS

U.S. Office Action dated Jun. 20, 2017 issued in counterpart U.S. Appl. No. 14/322,457, 18 pages.
European Search Report dated Aug. 13, 2018 issued in counterpart application No. 16846882.5-1221, 8 pages.
U.S. Office Action dated Mar. 7, 2019 issued in counterpart U.S. Appl. No. 15/934,193, 17 pages.
European Search Report dated Aug. 27, 2019 issued in counterpart application No. 16846882.5-1221, 8 pages.

* cited by examiner

COORDINATE MEASURING APPARATUS FOR MEASURING INPUT POSITION OF A TOUCH AND A COORDINATE INDICATING APPARATUS AND DRIVING METHOD THEREOF

PRIORITY

This application is a Continuation Application of U.S. patent application Ser. No. 15/267,940, which was filed in the U.S. Patent and Trademark Office on Sep. 16, 2016, which is a Continuation in Part of U.S. patent application Ser. No. 14/322,457, which was filed in the U.S. Patent and Trademark Office on Jul. 2, 2014, now U.S. Pat. No. 9,927,938, issued on Mar. 27, 2018, and claims priority under 35 U.S.C. § 119(e) to U.S. Provisional Patent Application No. 62/220,519, which was filed on Sep. 18, 2015 in the U.S. Patent and Trademark Office, and under 35 U.S.C. § 119(a) to Korean Patent Application Nos. 10-2013-0078176 and 10-2016-0093257, which were filed on Jul. 4, 2013 and Jul. 22, 2016, respectively, in the Korean Intellectual Property Office, the entire disclosure of each of which is incorporated herein by reference.

BACKGROUND

1. Field of the Disclosure

The present disclosure relates generally to a coordinate measuring apparatus and a method of controlling the same, and more particularly, to a coordinate measuring apparatus and a method of controlling the same, for simultaneously measuring touch positions of a user hand and a stylus pen.

2. Description of the Related Art

Recently, smart phones and tablet personal computers (PCs) have become widely used and technologies for a touch coordinate measuring apparatus installed therein have been actively developed. A smart phone or a tablet PC includes a touchscreen and a user may determine a certain point on the touchscreen indicated by using a finger or a stylus pen. A user may determine a certain point on a touchscreen to input a certain signal to a smart phone.

A conventional touchscreen detects only a user finger touch or only a stylus pen touch.

However, recently, there is an increasing need to employ a user's finger touch during a procedure using a stylus pen, and thus, there is a need for a method of recognizing both a user's finger touch and stylus pen touch.

SUMMARY

An aspect of the present disclosure provides a coordinate measuring apparatus and a method of controlling the same, for simultaneously measuring touch positions of a user's hand and a stylus pen.

Another aspect of the present disclosure provides a processor that may determine a position of a coordinate indicating apparatus based on a second receiving signal.

Another aspect of the present disclosure provides a processor that may determine an entirety of a touch panel as an activation region if a position of a coordinate indicating apparatus is not determined, determine only a preset region of the touch panel as an activation region, and determine a remaining region as a deactivation region if a position of the coordinate indicating apparatus is determined.

Another aspect of the present disclosure provides a preset region that may be an upper region of a touch panel.

Another aspect of the present disclosure provides a processor that may determine a form of a user's grip on a coordinate indicating apparatus and determine an activation region based on the determined form of the user's grip and a determined position of the coordinate indicating apparatus.

Another aspect of the present disclosure provides a processor that may determine a left side or an upper-left side as an activation region based on a determined position if the form of a user's grip is a right-handed grip and determine a right side or an upper-right side as an activation region based on the determined position if the form of the user's grip is a left-handed grip.

Another aspect of the present disclosure provides a processor that may determine a form of a user's grip based on a first receiving signal.

Another aspect of the present disclosure provides a receiver that may not receive a first receiving signal of an electrode corresponding to a determined deactivation region.

Another aspect of the present disclosure provides a processor that may calculate a capacitance between electrodes at intersections of a plurality of electrodes using a first receiving signal and determine a hand position using only the calculated capacitance corresponding to a determined activation region.

Another aspect of the present disclosure provides a processor that may calculate only capacitance between electrodes corresponding to an activation region among intersections of a plurality of electrodes and determine a hand position using the calculated capacitance.

Another aspect of the present disclosure provides a processor that may control a driver and a receiver to alternately receive a first receiving signal and a second receiving signal.

Another aspect of the present disclosure provides a touch panel that may include a first electrode group including a plurality of first electrodes arranged in a first direction, and a second electrode group including a plurality of second electrodes arranged in a second direction perpendicular to the first direction, where the receiver may receive a second receiving signal from a remaining portion of the first electrode group, where a driver drives a portion of a first electrode group in order to generate a first receiving signal.

Another aspect of the present disclosure provides a first receiving signal and a second receiving signal that may be signals of different frequency bands.

Another aspect of the present disclosure provides a driver that may generate a first driving signal for generating a first receiving signal and a second driving signal for generating a signal of a coordinate indicating an apparatus approaching a coordinate measuring apparatus via coupling, where the first driving signal and the second driving signal may be signals of different frequency bands.

Another aspect of the present disclosure provides a method that may further include determining a position of a coordinate indicating apparatus based on a second receiving signal.

Another aspect of the present disclosure provides a method of determining an activation region of the touch panel that may include determining an entirety of a touch panel as an activation region if a position of a coordinate indicating apparatus is not determined, determining only a preset region of the touch panel as an activation region, and determining a remaining region as a deactivation region if the position of the coordinate indicating apparatus is determined.

Another aspect of the present disclosure provides a preset region that may be an upper region of a touch panel.

Another aspect of the present disclosure provides a method of determining an activation region that may include determining a form of a user's grip on a coordinate indicating apparatus and determining an activation region based on the determined form of the user's grip and a determined position of the coordinate indicating apparatus.

Another aspect of the present disclosure provides a method of determining an activation region that may include determining a left side or an upper-left side as an activation region based on a determined position if a form of a user's grip is a right-handed grip and determining a right side or an upper-right side as an activation region based on the determined position if the form of the user's grip is a left-handed grip.

In accordance with an aspect of the present disclosure, a coordinate measuring apparatus is provided. The coordinate measuring apparatus includes a touch panel including a plurality of electrodes, a driver configured to generate a driving signal and to provide the driving signal to the touch panel, a receiver configured to receive a first receiving signal for detecting a change in capacitance from the touch panel and a second receiving signal corresponding to a signal transmitted from a coordinate indicating apparatus, and a processor configured to determine an activation region from which a hand position is detected, based on the second receiving signal, and determine the hand position in the determined activation region.

In accordance with another aspect of the present disclosure, a method of controlling a coordinate measuring apparatus including a touch panel is provided. The method includes generating, by a driver, a driving signal and providing the driving signal to the touch panel, receiving, by a receiver, a first receiving signal for detecting a change in capacitance of the touch panel, receiving, by the receiver, a second receiving signal corresponding to a signal transmitted from a coordinate indicating apparatus, determining, by a processor, an activation region from which a hand position is detected, based on the second receiving signal, and determining, by the processor, the hand position in the determined activation region.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

The embodiments of the present disclosure may be modified in different ways. Accordingly, certain embodiments of the present disclosure are illustrated in the accompanying drawings and are described below in detail. However, it should be understood that the present disclosure is not limited to a certain embodiment of the present disclosure, but is intended to include all modifications, equivalents, and substitutions within the scope of the present disclosure as defined by the appended claims and their equivalents. In addition, well-known functions or constructions are not described below in detail since they would obscure the present disclosure with unnecessary detail.

The terms "first," "second," etc. may be used to describe different components, but the components are not limited by the terms. The terms are only used to distinguish one component from another.

The terms used in the present disclosure are only used to describe the embodiments of the present disclosure, but are not intended to limit the scope of the present disclosure. A singular expression also includes the plural meaning as long as it is not defined otherwise in the context. In the present disclosure, the terms "include" and "consist of" indicate the presence of features, numbers, steps, operations, components, elements, or a combination thereof that are described in the present disclosure, but do not exclude the presence or possibility of the addition of one or more other features, numbers, steps, operations, components, elements, or a combination thereof.

In an embodiment of the present disclosure, the terms "module" and "unit" each indicate a component that performs at least one function or operation, which may be implemented with hardware, software, or a combination of hardware and software. In addition, a plurality of modules or a plurality of units may be integrated into at least one module, except for a module or a unit that must be implemented with certain hardware, and may be implemented with at least one processor.

Hereinafter, the present disclosure is described in detail with reference to the accompanying drawings.

Figure 1:
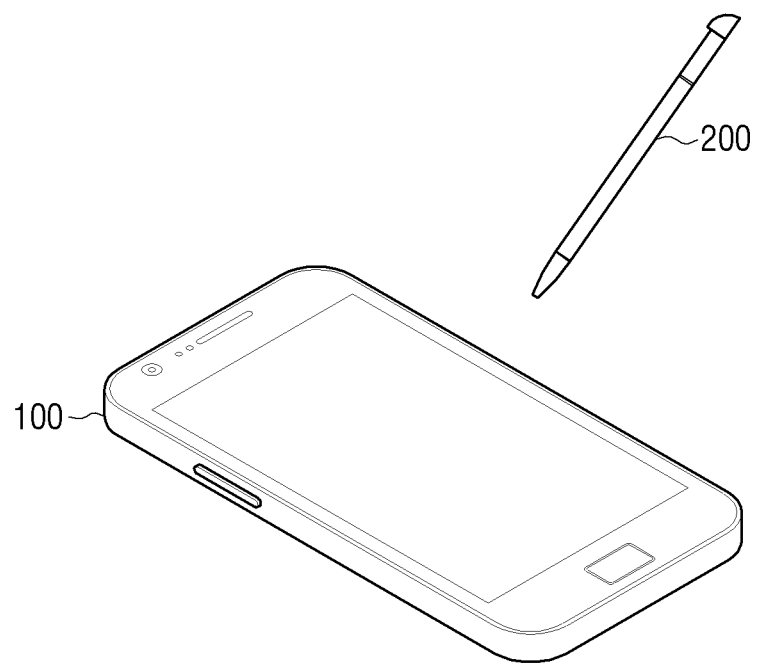
FIG. 1 is a diagram of a coordinate indicating system according to an embodiment of the present disclosure.

FIG. 1 is a diagram of a coordinate indicating system according to an exemplary embodiment of the present disclosure.

Referring to FIG. 1, the coordinate measuring system may include a coordinate measuring apparatus 100 and a coordinate indicating apparatus 200.

The coordinate measuring apparatus 100 may detect a stylus pen and/or a part of a user's body such as a finger and determine a coordinate of a touch position.

A configuration and operation of the coordinate measuring apparatus 100 is described below in detail with reference to FIGS. 2 and 17. In FIG. 1, the coordinate measuring apparatus 100 is illustrated in the form of a smart phone or a tablet PC, but the present disclosure is not limited thereto. In detail, the coordinate measuring apparatus 100 may be a touchpad or touchscreen, or an electronic device including a touchpad or touchscreen, such as a notebook computer, a cellular phone, a smart phone, a portable multimedia player (PMP), and a moving picture experts group audio layer 3 (MP3) player.

The coordinate indicating apparatus 200 may transmit a signal to at least one electrode in the coordinate measuring apparatus 100. The coordinate indicating apparatus 200 may be configured in the form of a stylus pen, but the present disclosure is not limited thereto. The coordinate indicating apparatus 200 may be a stylus pen using a passive method in which the stylus pen is operated using a driving signal provided from an external device as well as an active method in which the stylus pen is operated using it own power. The coordinate indicating apparatus 200 such as a stylus pen may have a relatively small touch area as compared to a finger.

The coordinate measuring apparatus 100 may determine whether a touch is performed by the coordinate indicating apparatus 200 such as a stylus pen or a finger. That is, the coordinate measuring apparatus 100 may identify a type of an object that causes a touch (e.g. a touch object). For example, a touch object may be a conductive object such as a finger or a stylus pen that is different from a conductive object.

The coordinate measuring apparatus 100 may preferentially measure a touch position of a touch object. In detail, the coordinate measuring apparatus 100 may measure a position of a touch object according to a change in capacitance due to a touch of a touch object. Position measurement according to a capacitance change is described below in greater detail.

The coordinate measuring apparatus 100 may include a digitizer. A digitizer may include at least one loop, where the at least one loop may allow the coordinate measuring apparatus 100 to interpolate an intensity of a reception (Rx) signal input to each loop of the coordinate indicating apparatus 200 based on a preset timing schedule so as to precisely determine a touch position of the coordinate indicating apparatus 200. This embodiment of the present disclosure is described below with reference to FIG. 4. In this case, interpolation may refer to a method of acquiring a value of a function for an arbitrary intermediate variable if only values of the continuous function are known for sparse values of the variable.

The coordinate measuring apparatus 100 may further include a touchscreen panel. The touchscreen panel may be configured as, for example, a capacitive type touchscreen panel and may detect a change in capacitance according to a finger touch. The touchscreen panel may determine a touch position of a finger based on a change in the detected capacitance. For example, the coordinate measuring apparatus 100 may measure a position of the coordinate indicating apparatus 200 such as a finger and a stylus pen using only a capacitive type touchscreen panel as described below with reference to FIG. 17.

The coordinate measuring apparatus 100 may further include a display device. The display device may process a display signal and provide visual data to a user.

Although FIG. 1 illustrates the case in which one coordinate indicating apparatus 200 is associated with the coordinate measuring apparatus 100, a plurality of coordinate indicating apparatuses may be associated with one coordinate measuring apparatus 100, and in this case, the coordinate measuring apparatus 100 may detect each of the plurality of coordinate indicating apparatuses.

Figure 2:
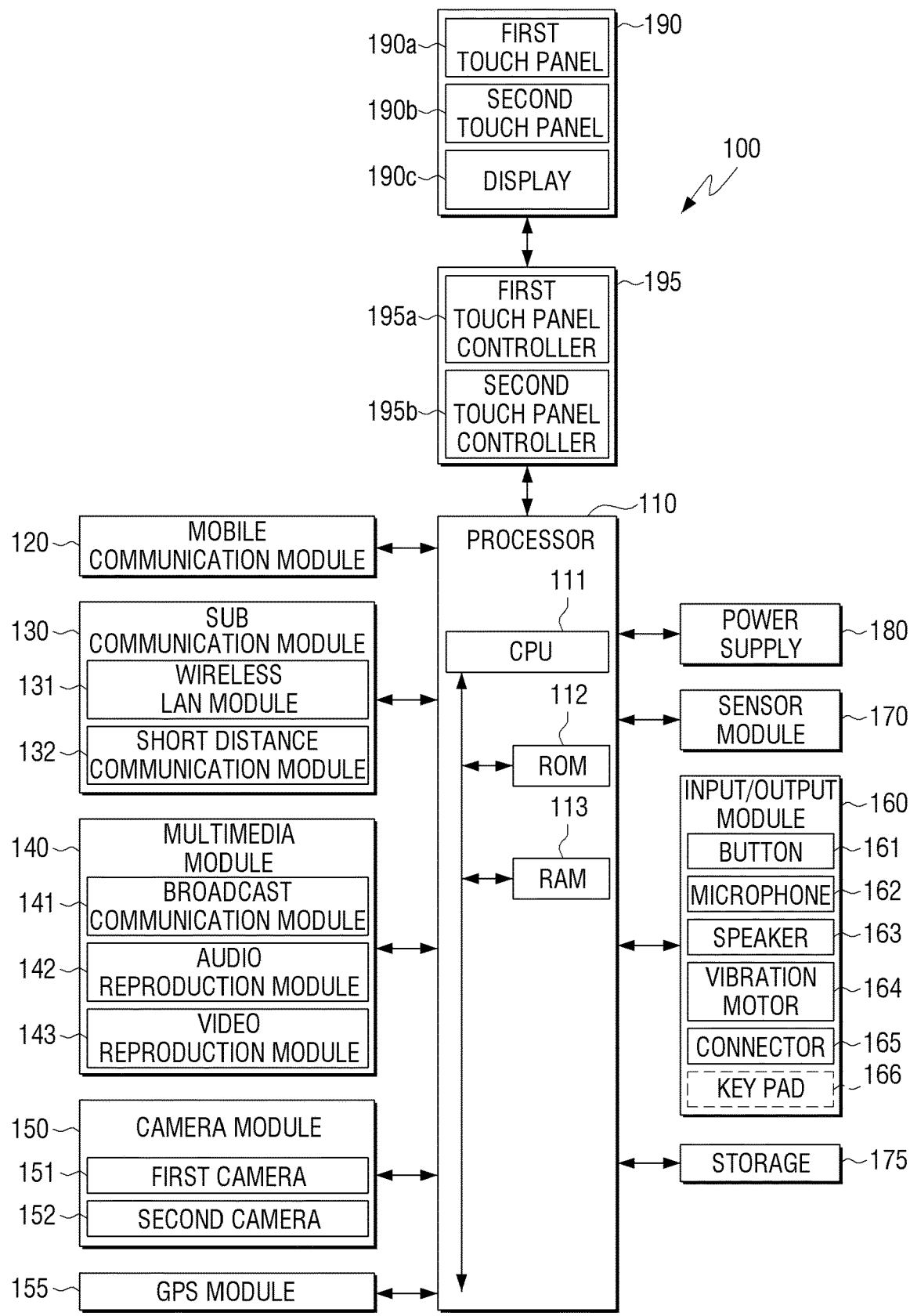
FIG. 2 is a block diagram of a coordinate measuring apparatus according to an embodiment of the present disclosure.

FIG. 2 is a block diagram of the coordinate measuring apparatus 100 according to an embodiment of the present disclosure.

Referring to FIG. 2, the coordinate measuring apparatus 100 may include a processor 110, a mobile communication module 120, a sub communication module 130, a multimedia module 140, a camera module 150, a global positioning system (GPS) module 155, an input/output module 160, a sensor module 170, a power supply 180, a touchscreen 190, and a touchscreen controller 195.

The coordinate measuring apparatus 100 may be connected to an external apparatus using the mobile communication module 120, the sub communication module 130, and a connector 165. The external apparatus may include another apparatus, a cellular phone, a smart phone, a tablet PC, and a server.

The processor 110 may include a central processing unit (CPU) 111, a read only memory (ROM) 112 for storing a control program for controlling the coordinate measuring apparatus 100, and a random access memory (RAM) 113 used as a record region for recording data or a signal input from outside the coordinate measuring apparatus 100 or an operation performed by the coordinate measuring apparatus 100. The CPU 111 may include a single core, a dual core, a triple core, or a quad core. The CPU 111, the ROM 112, and the RAM 113 may be connected to each other through an internal bus.

The processor 110 may control the mobile communication module 120, the sub communication module 130, the multimedia module 140, the camera module 150, the GPS module 155, the input/output module 160, the sensor module 170, the storage 175, the power supply 180, the touchscreen 190, and the touchscreen controller 195. The processor 110 may be referred to as a controller or a control unit in that the processor 110 controls components in the coordinate measuring apparatus 100.

The processor 110 may determine a touch state of a hand and/or the coordinate indicating apparatus 200 based on a signal received by the touchscreen 190. The processor 110 may determine a position of the hand and/or the coordinate indicating apparatus 200 based on the signal received by the touchscreen 190. The processor 110 may determine a detection region of a touch of a hand (e.g. a hand touch) on the touchscreen 190 based on a signal received by the touchscreen 190. In this case, the detection region of a hand touch may be an activation region of the touchscreen 190, in which the hand touch is detected, and a touchscreen region except that the activation region may be determined as a non-activation region.

The mobile communication module 120 may allow the coordinate measuring apparatus 100 to be connected to an external apparatus through mobile communication (e.g., wireless communication such as global system for mobile communications (GSM), universal mobile telecommunications system (UMTS), long term evolution (LTE), and wireless broadband (WiBRO)) using at least one antenna under control of the processor 110. The mobile communication module 120 may transmit/receive a radio signal for voice call, video call, a short message service (SMS), or a multimedia messaging service (MMS) to/from a cellular phone, a smart phone, a tablet PC, or another apparatus, which has a telephone number input to the coordinate measuring apparatus 100.

The sub communication module 130 may include at least one of a wireless local area network (LAN) module 131 and a short distance communication module 132. For example, the sub communication module 130 may include only the wireless LAN module 131, only the short distance communication module 132, or both the wireless LAN module 131 and the short distance communication module 132.

The wireless LAN module 131 may be connected to the Internet through a wireless access point (AP) under control of the processor 110. The wireless LAN module 131 may support a wireless LAN standard of Institute of Electrical and Electronics Engineers (IEEE) (e.g. IEEE 802.11x).

The short distance communication module 132 may wirelessly perform a short distance communication between the coordinate measuring apparatus 100 and an external apparatus under control of the processor 110. For example, if a touch position of a hand or a stylus pen in a region for receiving a command for transmitting certain data, the short distance communication module 132 may wirelessly transmit the certain data to an external apparatus. In detail, a short distance communication method corresponding to a touch position via the short distance communication module 132 may include Bluetooth®, Infrared Data Association (IrDA) communication, and so on.

The coordinate measuring apparatus 100 may include at least one of the mobile communication module 120, the wireless LAN module 131, and the short distance communication module 132. For example, the coordinate measuring apparatus 100 may include combinations of the mobile communication module 120, the wireless LAN module 131, and the short distance communication module 132 according to capability.

The multimedia module 140 may include at least one of a broadcast communication module 141, an audio reproduction module 142, and a video reproduction module 143.

The broadcast communication module 141 may receive a broadcast signal (e.g., a TV broadcast signal, a radio broadcast signal, or a data broadcast signal) and broadcast additional information (e.g., an electronic program guide (EPG) or an electronic service guide (ESG)), which are transmitted from a broadcaster through a broadcast communication antenna, under control of the processor 110.

The audio reproduction module 142 may reproduce a digital audio file (e.g., a file with a file extension of "mp3," "wma," "ogg," or "way") that is stored or received under control of the processor 110.

The video reproduction module 143 may reproduce a digital video file (e.g., a file with a file extension of "mpeg," "mpg," "mp4," "avi," "mov," or "mkv") that is stored or received under control of the processor 110. The video reproduction module 143 may reproduce a digital audio file.

The multimedia module 140 may include the audio reproduction module 142 and the video reproduction module 143 by excluding the broadcast communication module 141. The audio reproduction module 142 or the video reproduction module 143 of the multimedia module 140 may be included in the processor 110.

The camera module 150 may include at least one of a first camera 151 and a second camera 152, which captures a still image or a video image under control of the processor 110. The first camera 151 or the second camera 152 may include an auxiliary light source (e.g., a flash) for providing an amount of light required for photographing.

The first camera 151 may be disposed on a front surface of the coordinate measuring apparatus 100 and the second camera 152 may be disposed on a rear surface of the coordinate measuring apparatus 100. The first camera 151 and the second camera 152 may be disposed to be adjacent to each other (e.g., where an interval between the first camera 151 and the second camera 152 is greater than 1 cm but less than 8 cm) and may capture a three-dimensional (3D) still image or a 3D video image.

The GPS module 155 may receive electrical waves from a plurality of GPS satellites placed in an earth orbit and calculate a position of the coordinate measuring apparatus 100 using the time of arrival of an electrical wave to the coordinate measuring apparatus 100 from a GPS satellite.

The input/output module 160 may include at least one button 161, a microphone 162, a speaker 163, a vibration motor 164, the connector 165, and a key pad 166.

The at least one button 161 may be formed on a front surface, a lateral surface, or a rear surface of a housing of the coordinate measuring apparatus 100 and may include at least one of a power/lock button, a volume up button, a volume down button, a menu button, a home button, a back button, or a search button.

The microphone 162 may receive voice or sound to generate an electrical signal under control of the processor 110.

The speaker 163 may output sound corresponding to various signals (e.g., a radio signal, a broadcast signal, a digital audio file, a digital video file, or a sound of taking a photograph) of the mobile communication module 120, the sub communication module 130, the multimedia module 140, or the camera module 150 under control of the processor 110 externally of the coordinate measuring apparatus 100.

The speaker 163 may output sound (e.g., a button manipulation sound corresponding to a telephone conversation or a ring back tone) corresponding to a function performed by the coordinate measuring apparatus 100. At least one speaker 163 may be formed at an appropriate position or positions of a housing of the coordinate measuring apparatus 100.

The vibration motor 164 may convert an electrical signal into mechanical vibration under control of the processor 110. For example, if the coordinate measuring apparatus 100 in a vibration mode receives a voice call from another apparatus, the vibration motor 164 may be operated. At least one vibration motor 164 may be formed in a housing of the coordinate measuring apparatuses 100. The vibration motor 164 may be operated in response to a user touching the touchscreen 190 and a continuous movement of a touch on the touchscreen 190.

The connector 165 may be used as an interface for connecting the coordinate measuring apparatus 100 to an external apparatus or a power source. In detail, the connector 165 may transmit data stored in the storage 175 of the coordinate measuring apparatus 100 to an external apparatus or receive data from an external apparatus through a wired cable connected to the connector 165 under control of the processor 110. Power may be input from a power source through a wired cable connected to the connector 165 or may charge a battery.

The key pad 166 may receive a key input from a user for controlling the coordinate measuring apparatus 100. The key pad 166 may include a physical key pad formed in the coordinate measuring apparatus 100 or a virtual key pad displayed on the touchscreen 190. A physical key pad formed in the coordinate measuring apparatus 100 may be excluded according to the capability or configuration of the coordinate measuring apparatus 100.

The sensor module 170 may include at least one sensor for detecting a state of the coordinate measuring apparatus 100. For example, the sensor module 170 may include a proximity sensor for detecting whether a user approaches the coordinate measuring apparatus 100, an illumination sensor for detecting an amount of light around the coordinate measuring apparatus 100, or a motion sensor for detecting an operation (e.g., rotation of the coordinate measuring apparatus 100 or acceleration or vibration applied to the coordinate measuring apparatus 100) of the coordinate measuring apparatus 100. At least one sensor may detect a state, generate a signal corresponding to the detection, and transmit the signal to the processor 110. A sensor of the sensor module 170 may be added or deleted according to the capability of the coordinate measuring apparatus 100.

The storage 175 may store a signal or data that is input/output to correspond to operations of the mobile communication module 120, the sub communication module 130, the multimedia module 140, the camera module 150, the GPS module 155, the input/output module 160, the sensor module 170, and the touchscreen 190 under control of the processor 110. The storage 175 may store control programs and applications for controlling the coordinate measuring apparatus 100 or the processor 110.

The term "storage" may include the storage 175, the ROM 112 and the RAM 113 in the processor 110, and a memory card (e.g., a secure digital (SD) card and a memory stick) installed in the coordinate measuring apparatus 100. The storage may include a non-volatile memory, a volatile memory, a hard disk drive (HDD), or a solid state drive (SSD).

The power supply 180 may supply power to at least one battery disposed in the housing of the coordinate measuring apparatus 100 under control of the processor 110. The at least one battery may supply power to the coordinate measuring apparatus 100. The power supply 180 may supply power input from an external power source through a wired cable connected to the connector 165 to the coordinate measuring apparatus 100.

The touchscreen 190 may provide a user interface corresponding to various services (e.g., a call, data transmission, a broadcast, and taking a photograph) to a user. The touchscreen 190 may transmit a signal corresponding to at least one touch input to a user interface to the touchscreen controller 195. The touchscreen 190 may receive at least one position input via a touch by a part of a user's body (e.g., a finger or a thumb) or a touchable input element (e.g., a stylus pen). The touchscreen 190 may receive a continuous motion of a touch among at least one touches. The touchscreen 190 may transmit a signal corresponding to a continuous motion of an input touch to the touchscreen controller 195.

In the present disclosure, a touch is not be limited to a touch by a part of a user's body or a touch by an input element with the touchscreen 190, but may include a non-touch. An interval for detection in the touchscreen 190 may be changed according to the capability or structure of the coordinate measuring apparatus 100.

The touchscreen 190 may include, for example, a first touch panel 190*a* and a second touch panel 190*b*. In this case, the first touch panel 190*a* may measure a touch or the proximity of a part of a user body. For example, the first touch panel 190*a* may be configured in a resistive manner, a capacitive manner, an infrared manner, or an acoustic wave manner. In this case, the processor 110 may determine a signal for controlling a display 190*c* from among detected signals of the first touch panel 190*a*.

The second touch panel 190*b* may measure a touch or the proximity of a device such as a stylus pen. For example, the second touch panel 190*b* may be configured in an electromagnetic (EMR) measuring manner.

The display 190*c* may display a received image signal.

In an embodiment of the present disclosure, the touchscreen 190 may be configured as only one touch panel. For example, a touch of a part of a user body and a position of the coordinate indicating apparatus 200 such as a stylus pen may be detected through a touch panel operated in an electrically coupled resonance (ECR) manner, as described below with reference to FIG. 17.

The touchscreen controller 195 may convert a signal received from the touchscreen 190 into a digital signal (e.g., X and Y coordinates) and transmit the digital signal to the processor 110. In this case, the processor 110 may control the touchscreen 190 using a digital signal received from the touchscreen controller 195. For example, the processor 110 may select a shortcut icon displayed on the touchscreen 190 or execute an application related to a shortcut icon in response to a touch. The touchscreen controller 195 may be included in the processor 110. The touchscreen controller 195 may include, for example, a first touch panel controller 195*a* for controlling the first touch panel 190*a* and a second touch panel controller 195*b* for controlling the second touch panel 190*b*.

Although the present embodiment has been described in terms of a case in which the touchscreen controller 195 generates a digital signal, that is, a case in which the touchscreen controller 195 detects a position of a hand or a position of a coordinate indicating apparatus 200, a position determining operation may also be performed by the processor 110.

The processor 110 may detect various user inputs received through the camera module 150, the input/output module 160, the sensor module 170, and so on as well as the touchscreen 190. A user input may include various forms of information items input to the coordinate measuring apparatus 100, such as a gesture, a voice, an eye movement, a bio-signal of a user, and a touch. The processor 110 may control the coordinate measuring apparatus 100 to perform a predetermined operation or function according to a detected user input.

Figure 3:
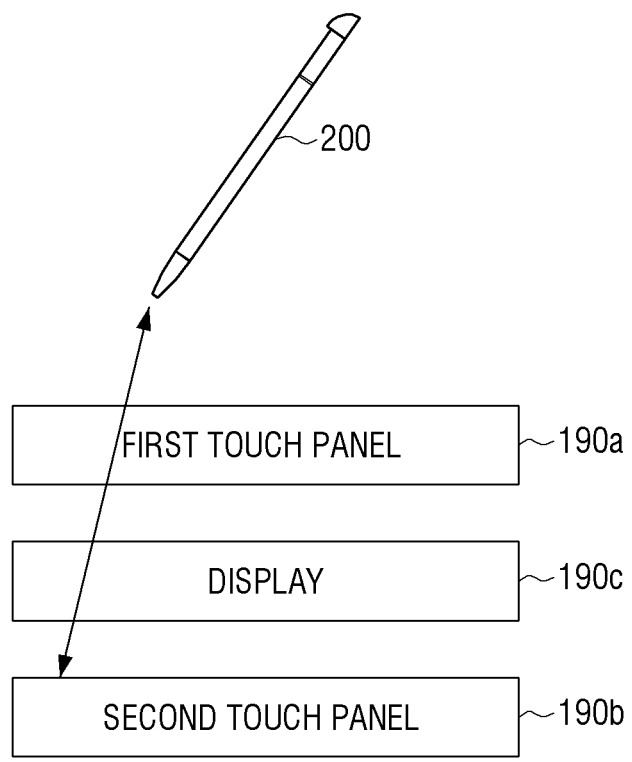
FIG. 3 is a side view of a touchscreen according to an embodiment of the present disclosure.

FIG. 3 is a side view of the touchscreen 190 according to an embodiment of the present disclosure.

Referring to FIG. 3, the second touch panel 190*b*, the display 190*c*, and the first touch panel 190*a* may be sequentially stacked. In detail, the display 190*c* may be disposed on the second touch panel 190*b* and the first touch panel 190*a* may be disposed on the display 190*c*.

In an embodiment of the present disclosure, the first touch panel 190*a* and the display 190*c* may be configured as one touchscreen 190.

The second touch panel 190*b* may measure an electromagnetic signal received from the coordinate indicating apparatus 200 such as a stylus pen to measure an input point indicated by the coordinate indicating apparatus 200.

The first touch panel 190a may measure a change in capacitance of a touch point of a user's finger to measure the touch point of the finger. For example, in order to measure a change in capacitance of a touch point of a user's finger, the first touch panel 190a may include an electrode channel formed of a transparent material such as indium tin oxide (ITO) so as to allow a user to view an image output from the display 190c.

Figure 4:
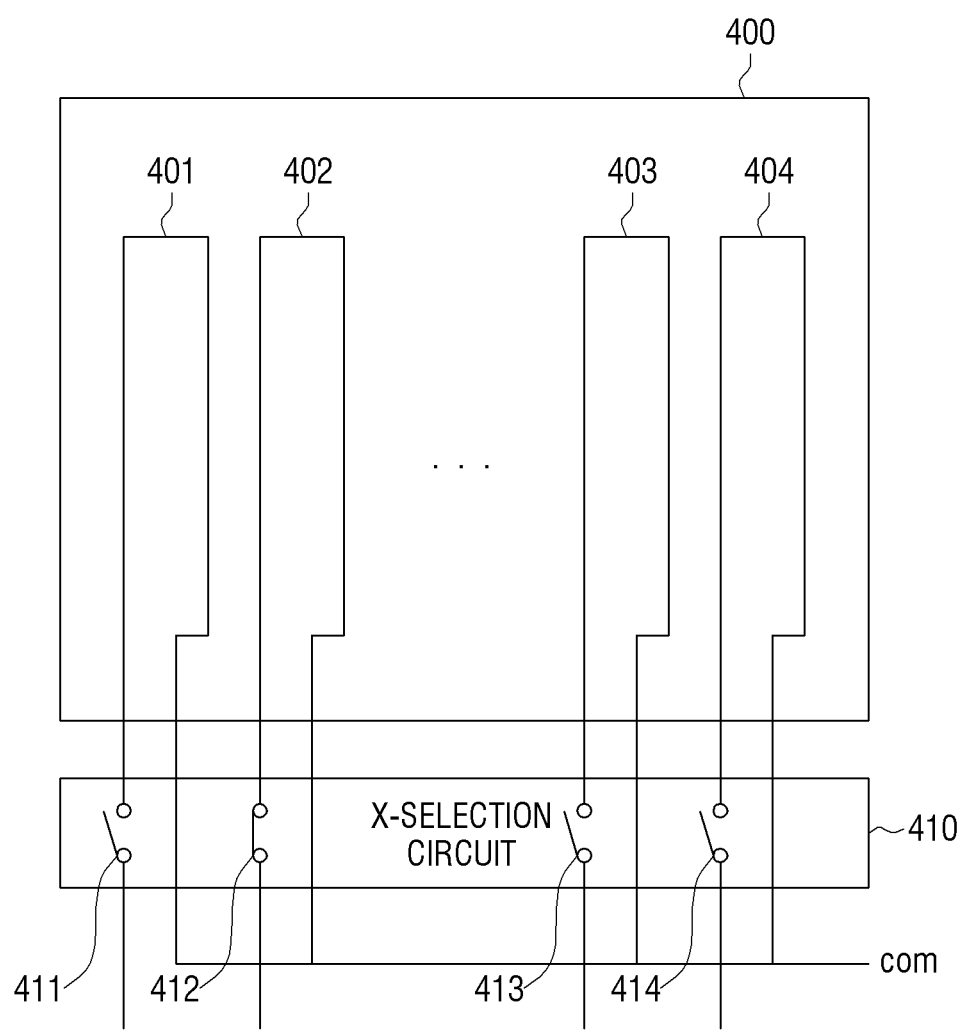
FIG. 4 is a diagram of a second touch panel of FIG. 3 according to an embodiment of the present disclosure.

FIG. 4 is a diagram of the second touch panel 190b of FIG. 3 according to an embodiment of the present disclosure.

Referring to FIG. 4, the second touch panel 190b may be configured with a loop portion 400.

The loop portion 400 may include a first loop 401, a second loop 402, a third loop 403, and a fourth loop 404. In this case, the first loop 401 to the fourth loop 404 may be arranged in a longitudinal direction of a y-axis direction rather than in an x-axis direction. The first loop 401 to the fourth loop 404 may each transmit an electromagnetic signal, i.e., a transmission (Tx) signal or receive an electromagnetic signal, i.e., an Rx signal. First ends of the first loop 401 to the fourth loop 404 may be connected to a first switch 411, a second switch 412, a third switch 413, and a fourth switch 414, respectively of an X-selection circuit 410. Second ends of the first loop 401 to the fourth loop 404 may be connected to a common terminal "com."

The processor 110 may control the first switch 411 to the fourth switch 414 of the X-selection circuit 410 to control a connection state of the first loop 401 to the fourth loop 404 with the processor 110. For example, the processor 110 may control the first switch 411 for a first sub period in an on state. That is, the processor 110 may connect the first loop 401 to the processor 110 for the first sub period. The processor 110 may control a second switch 412 to connect the second loop 402 to the processor 110 for a second sub period, control the third switch 413 to connect the third loop 403 to the processor 110 for a third sub period, and control the fourth switch 414 to connect the fourth loop 404 to the processor 110 for a fourth sub period.

Figure 5:
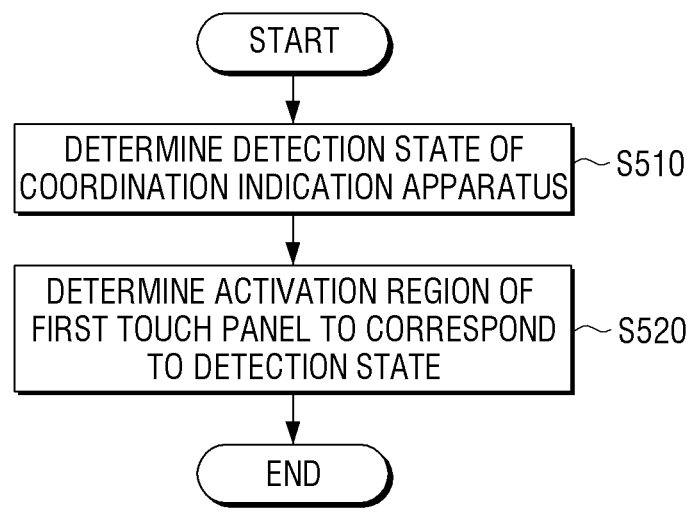
FIG. 5 is a flowchart of a method of controlling a coordinate measuring apparatus according to an embodiment of the present disclosure.

FIG. 5 is a flowchart of a method of controlling the coordinate measuring apparatus 100 according to an embodiment of the present disclosure.

Referring to FIG. 5, the coordinate measuring apparatus 100 may determine a touch state (or a detection state) of the coordinate indicating apparatus 200 at step S510. In detail, the coordinate measuring apparatus 100 may determine whether a size of an Rx signal received from the coordinate indicating apparatus 200 is greater than or equal to a preset size. For example, if the size of the Rx signal received from the coordinate indicating apparatus 200 is greater than or equal to the preset size, the coordinate measuring apparatus 100 may determine that the coordinate indicating apparatus 200 is touched. If the size of the Rx signal received from the coordinate indicating apparatus 200 is less than the preset size, the coordinate measuring apparatus 100 may determine that the coordinate indicating apparatus 200 is not touched. In this case, the touch state may refer to a state in which the coordinate indicating apparatus 200 either touches the coordinate measuring apparatus 100 or is positioned within a preset distance of the coordinate indicating apparatus 200.

Then, the coordinate measuring apparatus 100 may determine an active area of a first touch panel 190a(a) to correspond to a touch state of the coordinate indicating apparatus 200 at step S520. In detail, upon determining that the coordinate indicating apparatus 200 is touched, the coordinate measuring apparatus 100 may activate only a preset portion of the first touch panel 190a. In addition, upon determining that the coordinate indicating apparatus 200 is not touched, the coordinate measuring apparatus 100 may activate an entire area of the first touch panel 190a.

As described above, the first touch panel 190a may detect a touch of a part of a user's body such as a finger. If the coordinate indicating apparatus 200 is touched by the coordinate measuring apparatus 100 such as a pen, the coordinate measuring apparatus 100 may activate only a part of portion of the first touch panel 190a and deactivate the remaining portion and, thus, a touch of a part of a user's body may not be detected. Accordingly, even if a user performs an input while gripping a stylus pen and touching the touchscreen 190 with a part of a hand, a malfunction due to a touch between the hand and the touchscreen 190 may be prevented.

Figure 6:
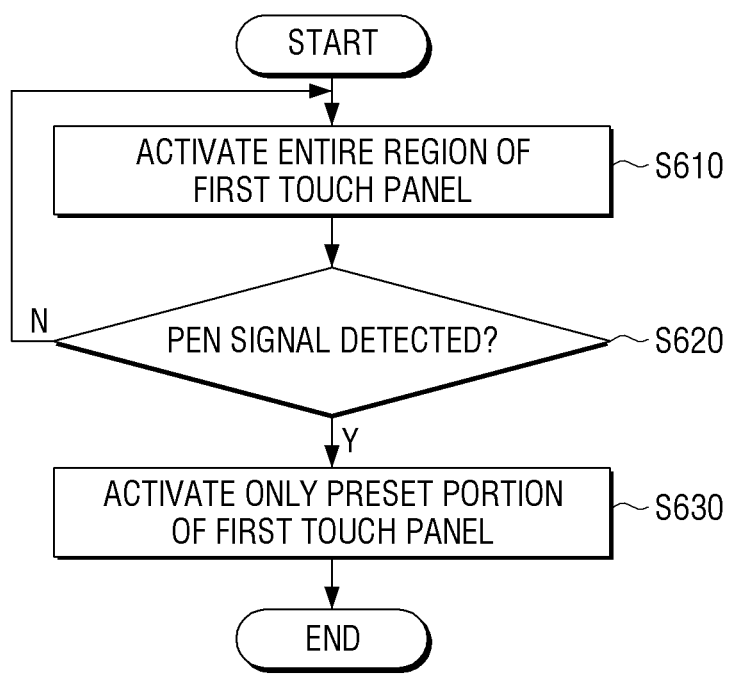
FIG. 6 is a flowchart of a method of controlling a coordinate measuring apparatus according to an embodiment of the present disclosure.
Figure 7:
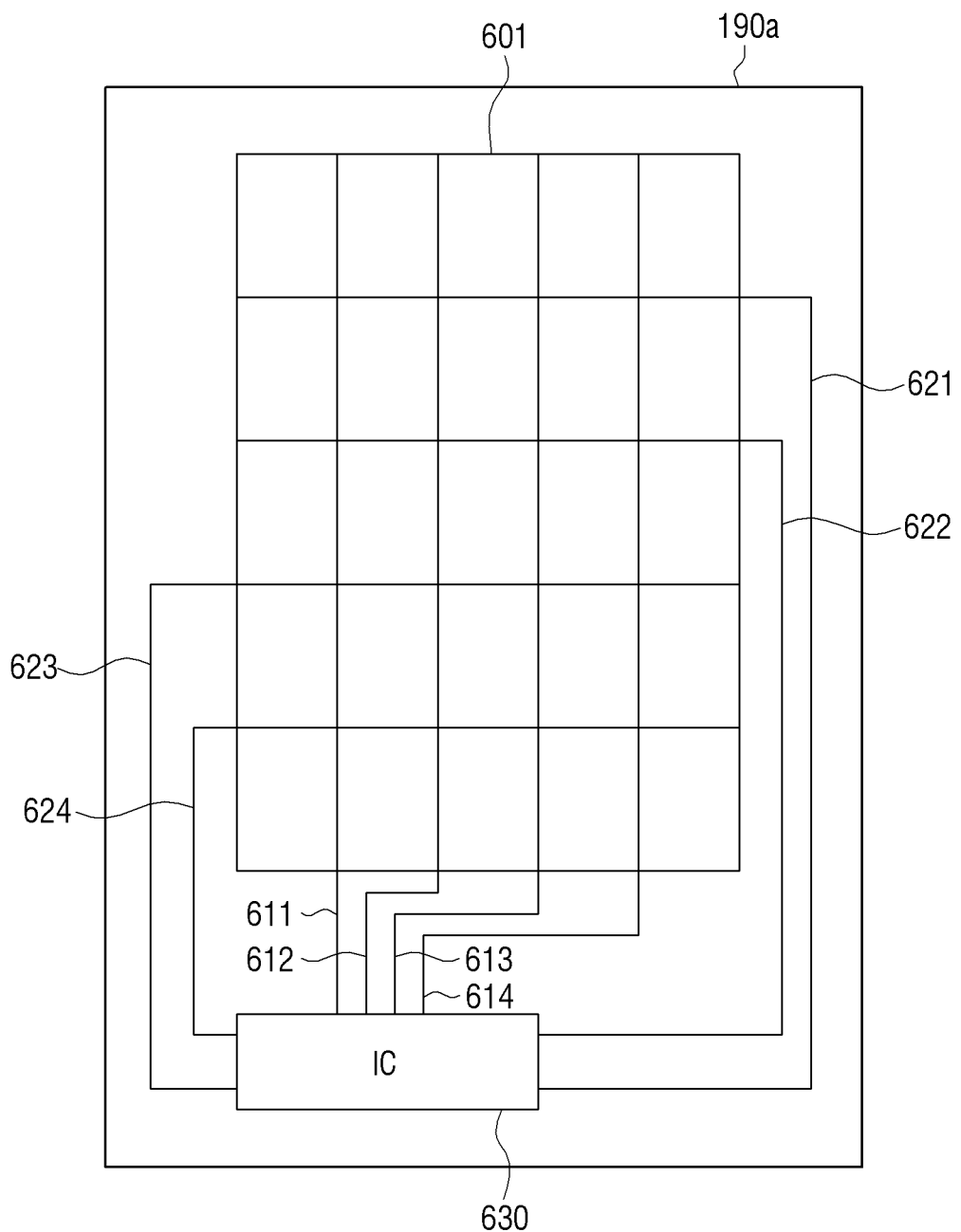
FIGS. 7 to 9 are diagrams of operations illustrated in FIG. 6 according to an embodiment of the present disclosure.
Figure 8:
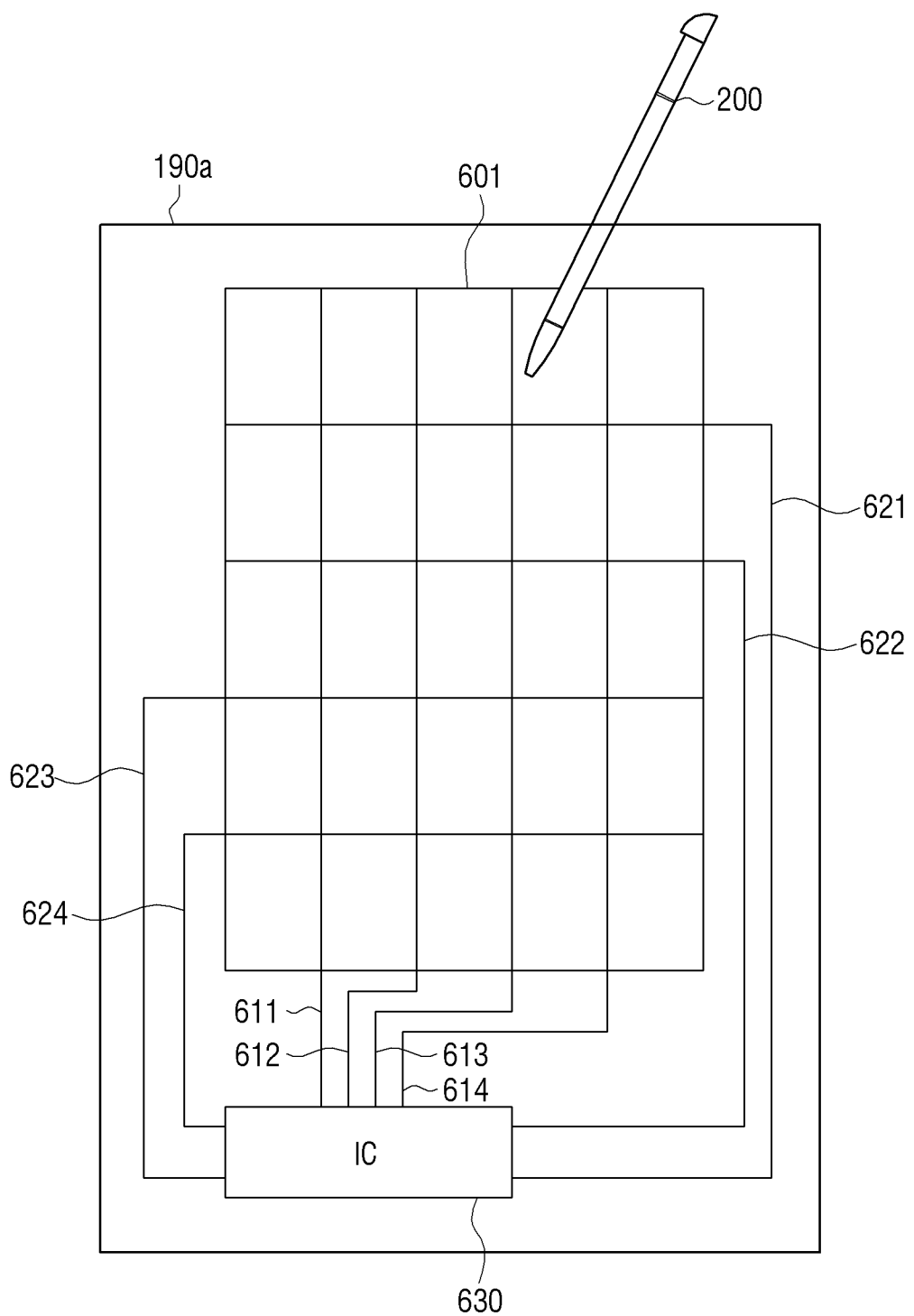
Figure 9:
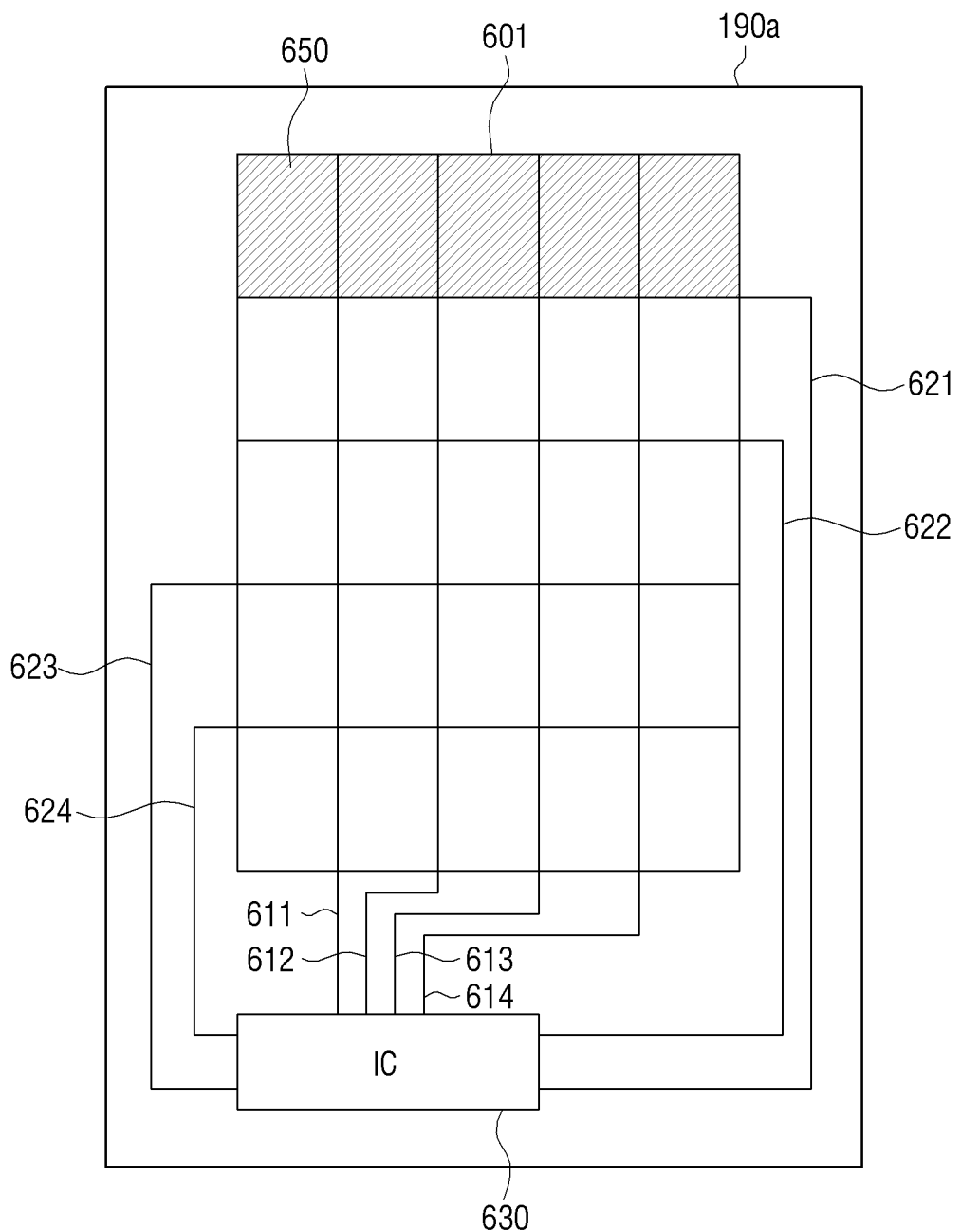

FIG. 6 is a flowchart of a method of controlling a coordinate measuring apparatus 100 according to an embodiment of the present disclosure. FIGS. 7 to 9 are diagrams of operations illustrated in FIG. 6 according to an embodiment of the present disclosure.

Referring to FIG. 6, the coordinate measuring apparatus 100 may activate an entirety of a first touch panel 190a at step S610. In detail, as illustrated in FIG. 7, the processor 110 may activate an entirety of an electrode portion 601. Hereinafter, a configuration of the first touch panel 190a is described below in detail with reference to FIG. 7.

Referring to FIG. 7, the first touch panel 190a may include the electrode portion 601, x-axis electrode wirings 611, 612, 613, and 614, the y-axis electrode wirings 621, 622, 623, and 624, and an integrated circuit (IC) 630.

The electrode portion 601 may detect a touch of a part of a user's body. For example, a change in capacitance due to a touch of a part of a user's body may be detected. The x-axis electrode wirings 611, 612, 613, and 614 and the y-axis electrode wirings 621, 622, 623, and 624 may output signals input from the electrode portion 601 to the IC 630. The IC 630 may determine a touch point of a part of a user's body based on signals received from the x-axis electrode wirings 611, 612, 613, and 614 and the y-axis electrode wirings 621, 622, 623, and 624.

Referring to FIG. 6, the coordinate measuring apparatus 100 may detect a pen signal at step S620. For example, as illustrated in FIG. 8, a coordinate indicating apparatus (e.g. a stylus pen) 200 may approach the coordinate measuring apparatus 100. As the stylus pen 200 is placed on the coordinate measuring apparatus 100, the second touch panel 190b may detect the stylus pen 200.

Upon determining that the pen signal is detected at step S630, the coordinate measuring apparatus 100 may activate only a preset part of the first touch panel 190a at step S630. For example, as illustrated in FIG. 9, the processor 110 may activate only an upper portion 650 (e.g. a hatched region) of the electrode portion 601. Accordingly, even if a part of a user's body touches the remaining portion (e.g. a deactivation region) of the electrode portion 601, the IC 630 may not detect the touch, thereby preventing a malfunction due to touch of a part of a user's body.

Even if a pen signal is detected, a hand touch of a user may be detected from a predetermined region, and the user may input various touch gestures such as an edge flick through the corresponding region.

The remaining region, except for a preset region (i.e., an upper region), may be set as a deactivation region, thereby preventing a touch error due to a hand touch, i.e., a touch of a palm during a procedure of gripping a stylus pen.

Although the case in which only an upper region of a first touch region is used as an activation region is described above, the activation region may be set using various methods, which are described below with reference to FIGS. 16, 22, and 23.

Figure 10:
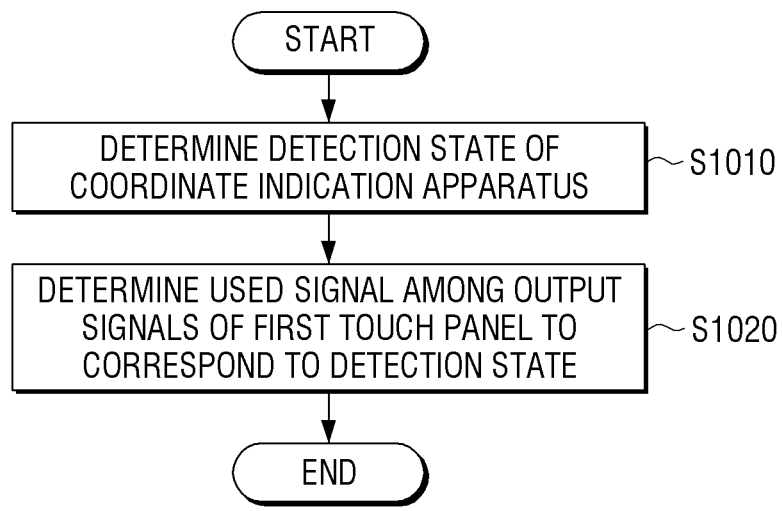
FIG. 10 is a flowchart of a method of controlling a coordinate measuring apparatus according to an embodiment of the present disclosure.

FIG. 10 is a flowchart of a method of controlling the coordinate measuring apparatus 100 according to an embodiment of the present disclosure.

Referring to FIG. 10, the coordinate measuring apparatus 100 may determine a touch state (or a detection state) of the coordinate indicating apparatus 200 at step S1010. In detail, the coordinate measuring apparatus 100 may determine whether a size of an Rx signal received from the coordinate indicating apparatus 200 is greater than or equal to a preset size and determine that the coordinate indicating apparatus 200 is touched if the size of the Rx signal received from the coordinate indicating apparatus 200 is greater than or equal to the preset size. The coordinate measuring apparatus 100 may determine that the coordinate measuring apparatus 100 is not touched if the size of the Rx signal received from the coordinate indicating apparatus 200 is less than the preset size.

Then, the coordinate measuring apparatus 100 may determine which signal is used among output signals of the first touch panel 190a so as to correspond to the touch state of the coordinate indicating apparatus 200 at step S1020. For example, upon determining that the coordinate indicating apparatus 200 is touched, the coordinate measuring apparatus 100 may use only a preset signal among the output signals of the first touch panel 190a.

If the coordinate indicating apparatus 200 does not touch the coordinate measuring apparatus 100, the coordinate measuring apparatus 100 may use all of the output signals of the first touch panel 190a. As described above, the first touch panel 190a may detect a touch by a part of a user's body such as a user finger. In response to the coordinate measuring apparatus 100 being touched by a coordinate indicating apparatus 200 such as a pen, the coordinate measuring apparatus 100 may use only a preset signal among the output signals of the first touch panel 190a and may not use the remaining signals and, thus, may not detect a touch by a part of a user's body. Accordingly, even if a user performs an input while gripping a stylus pen and touching the touchscreen 190 with a part of a hand, a malfunction due to a touch between the hand and the touchscreen 190 may be prevented.

Figure 11:
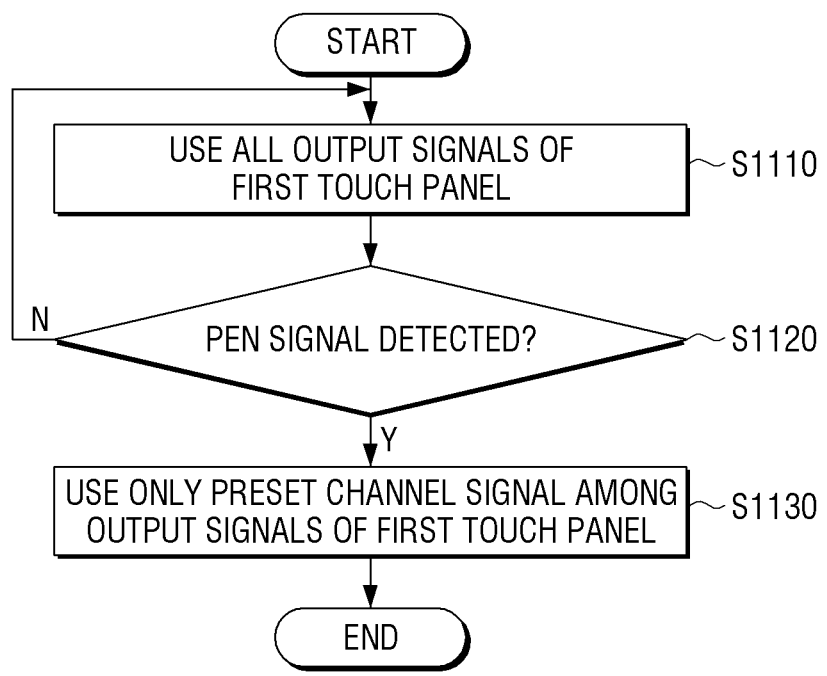
FIG. 11 is a flowchart of a method of controlling a coordinate measuring apparatus according to an embodiment of the present disclosure.

FIG. 11 is a flowchart of a method of controlling the coordinate measuring apparatus 100 according to an embodiment of the present disclosure.

Referring to FIG. 11, the coordinate measuring apparatus 100 may use all signals output from the first touch panel 190a at step S1110. For example, in FIG. 7, the processor 110 may determine an input point of a part of a user body using all signals input from the x-axis electrode wirings 611, 612, 613, and 614 and the y-axis electrode wirings 621, 622, 623, and 624.

The coordinate measuring apparatus 100 may detect a pen signal at step S1120. For example, as illustrated in FIG. 8, the stylus pen 200 may approach the coordinate measuring apparatus 100 and a second touch panel 190b may detect a signal of the stylus pen 200.

In this case, the coordinate measuring apparatus 100 may determine an input point of a part of a user body using only some signals at step S1130. That is, the processor 110 may not use the signal input from the y-axis electrode wirings 622, 623, and 624. Accordingly, even if the user touches portions corresponding to the y-axis electrode wirings 622, 623, and 624 with a part of the user's body, a malfunction due to the touch may be prevented.

A touch of a user's hand may be detected in an activation region and, thus, various gestures of the user among position detection operations of the coordinate indicating apparatus 200 may be simultaneously input.

Figure 12:
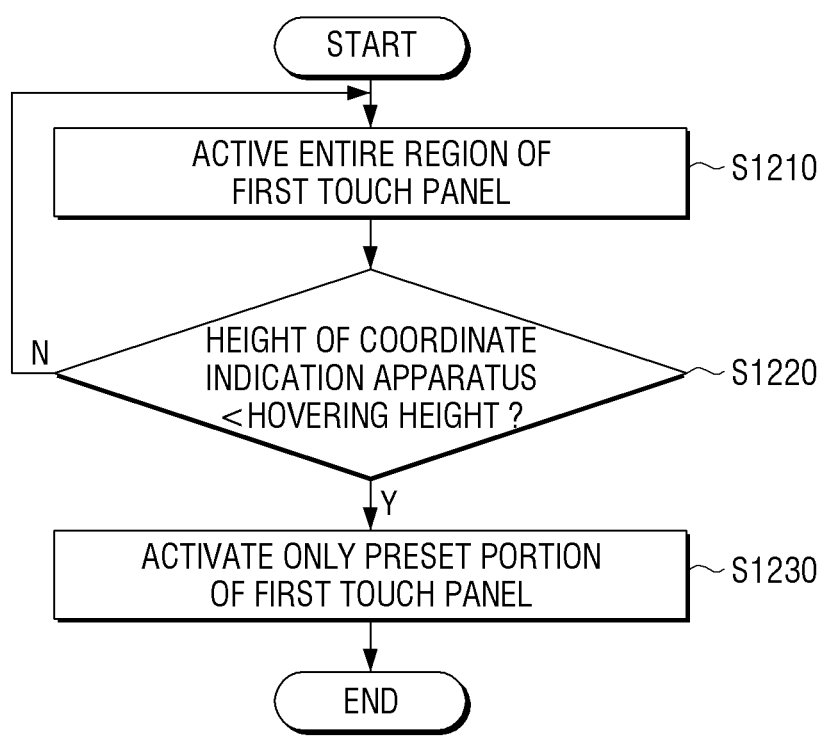
FIG. 12 is a flowchart of a method of controlling a coordinate measuring apparatus according to an embodiment of the present disclosure.
Figure 13:
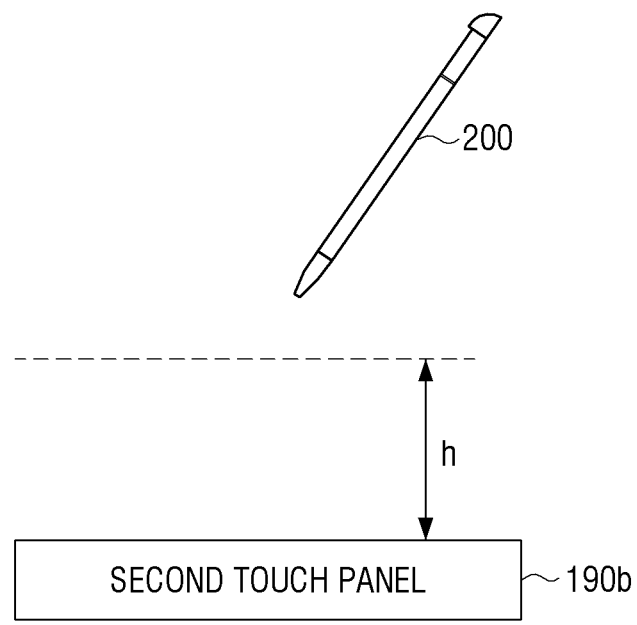
FIGS. 13 and 14 are diagrams of a controlling method illustrated in FIG. 12 according to an embodiment of the present disclosure.
Figure 14:
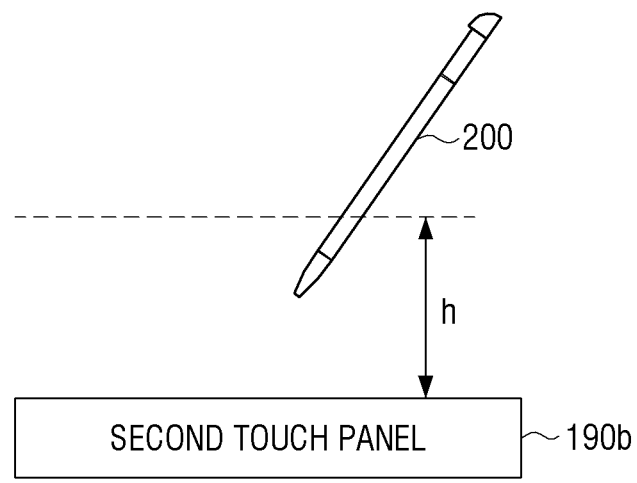

FIG. 12 is a flowchart of a method of controlling the coordinate measuring apparatus 100 according to an embodiment of the present disclosure. FIGS. 13 and 14 are diagrams of the controlling method illustrated in FIG. 12.

Referring to FIG. 12, the coordinate measuring apparatus 100 may activate an entirety of the first touch panel 190a at step S1210.

The coordinate measuring apparatus 100 may determine whether a height (i.e., a distance between the second touch panel 190b and a conductive tip of the coordinate indicating apparatus 200) of the coordinate indicating apparatus 200 is less than a hovering height at step S1220. In detail, the coordinate measuring apparatus 100 may determine that the height of the coordinate indicating apparatus 200 is less than the hovering height based on a size of a signal received from the coordinate indicating apparatus 200.

If the height of the coordinate indicating apparatus 200 is greater than or equal to the hovering height at step S1220, the coordinate measuring apparatus 100 may maintain activation of the entirety of the first touch panel 190a at step S1210. For example, as illustrated in FIG. 13, if the distance between the second touch panel 190b and the coordinate indicating apparatus 200 is greater than or equal to a hovering height (h), the coordinate measuring apparatus 100 may maintain activation of the entirety of the first touch panel 190a. In this case, whether the distance between the coordinate indicating apparatus 200 and the second touch panel 190b is equal to, greater than, or less than the hovering height (h) may be determined according to whether the intensity of an Rx signal input to the second touch panel 190b from the coordinate indicating apparatus 200 is less than or equal to, or greater than a preset threshold value. For example, if the intensity of an Rx signal input to the second touch panel 190b from the coordinate indicating apparatus 200 is less than or equal to the preset threshold value, the processor 110 may determine a distance between the coordinate indicating apparatus 200 and the second touch panel 190b is greater than or equal to the hovering height (h). In addition, if the intensity of the Rx signal input to the second touch panel 190b from the coordinate indicating apparatus 200 exceeds a preset threshold value, the processor 110 may determine that a distance between the coordinate indicating apparatus 200 and the second touch panel 190b is less than the hovering height (h).

If a height of the coordinate indicating apparatus 200 is less than the hovering height (h) at step S1220, the coordinate measuring apparatus 100 may activate only a preset portion of the first touch panel 190a at step S1230. For example, as illustrated in FIG. 14, if a distance between the second touch panel 190b and the coordinate indicating apparatus 200 is less than the hovering height (h), the coordinate measuring apparatus 100 may activate only a preset portion of the first touch panel 190a.

That is, the coordinate indicating apparatus 200 may determine an activation region of the first touch panel 190a according to a distance between the coordinate measuring apparatus 100 and the coordinate indicating apparatus 200. In this case, the coordinate indicating apparatus 200 may change the size of the activation region by as much as a distance corresponding to the height of the coordinate indicating apparatus 200. For example, if the height of the coordinate indicating apparatus 200 is greater than or equal to a first height, the coordinate indicating apparatus 200 may determine an entire region of the second touch panel 190*b* as the activation region, if the height of the coordinate indicating apparatus 200 is greater than or equal to a second height that is smaller than the first height, the coordinate indicating apparatus 200 may determine a half region of the second touch panel 190*b* as the activation region, and if the height of the coordinate indicating apparatus 200 corresponds to a state (i.e., a third height smaller than the second height) where the coordinate indicating apparatus 200 touches the first touch panel 190*a*, the coordinate indicating apparatus 200 may determine only a portion (with a size illustrated in FIG. 9) of an upper region of the second touch panel 190*b* as the activation region.

Figure 15:
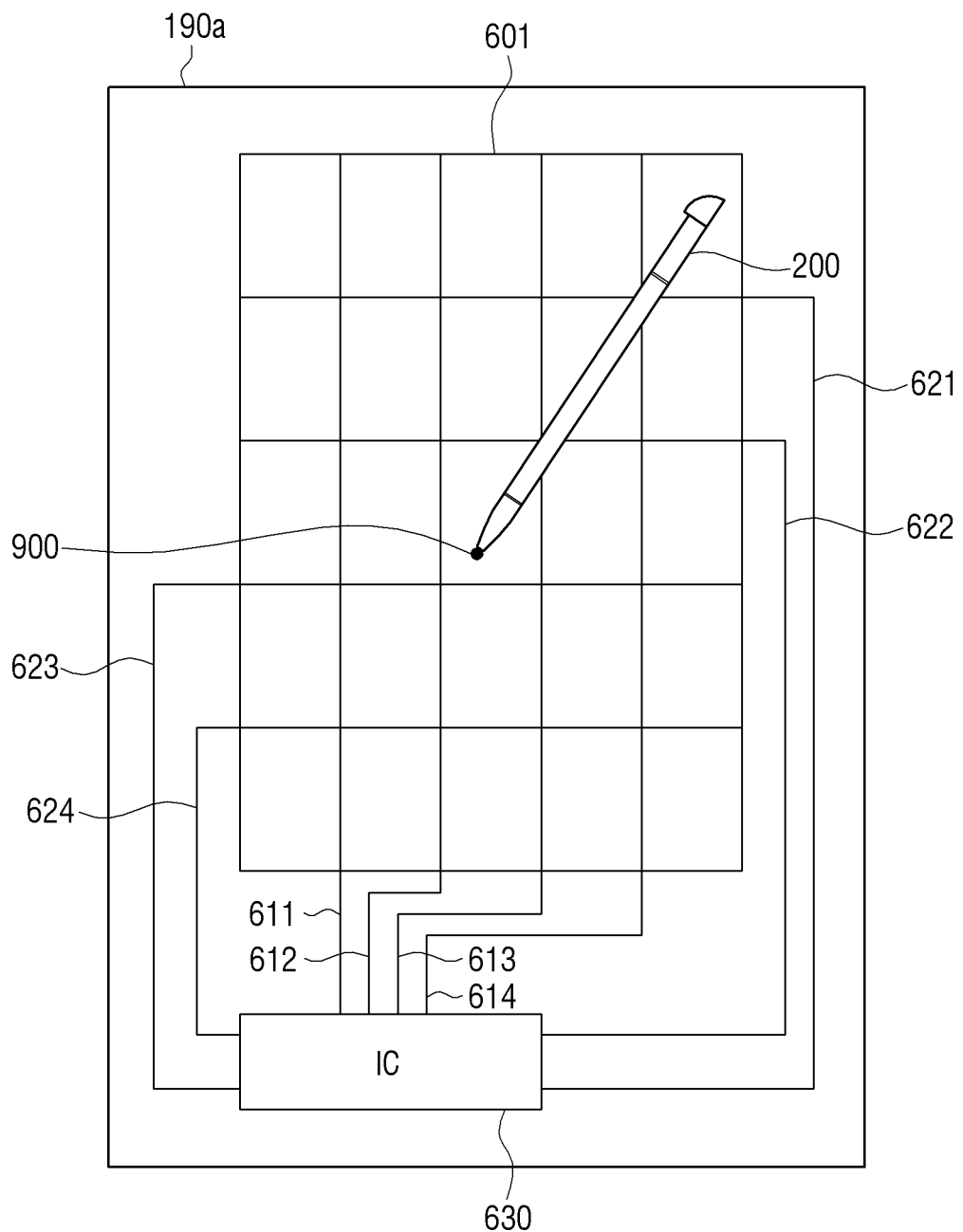
FIGS. 15 and 16 are diagrams of a controlling method according to an embodiment of the present disclosure.
Figure 16:
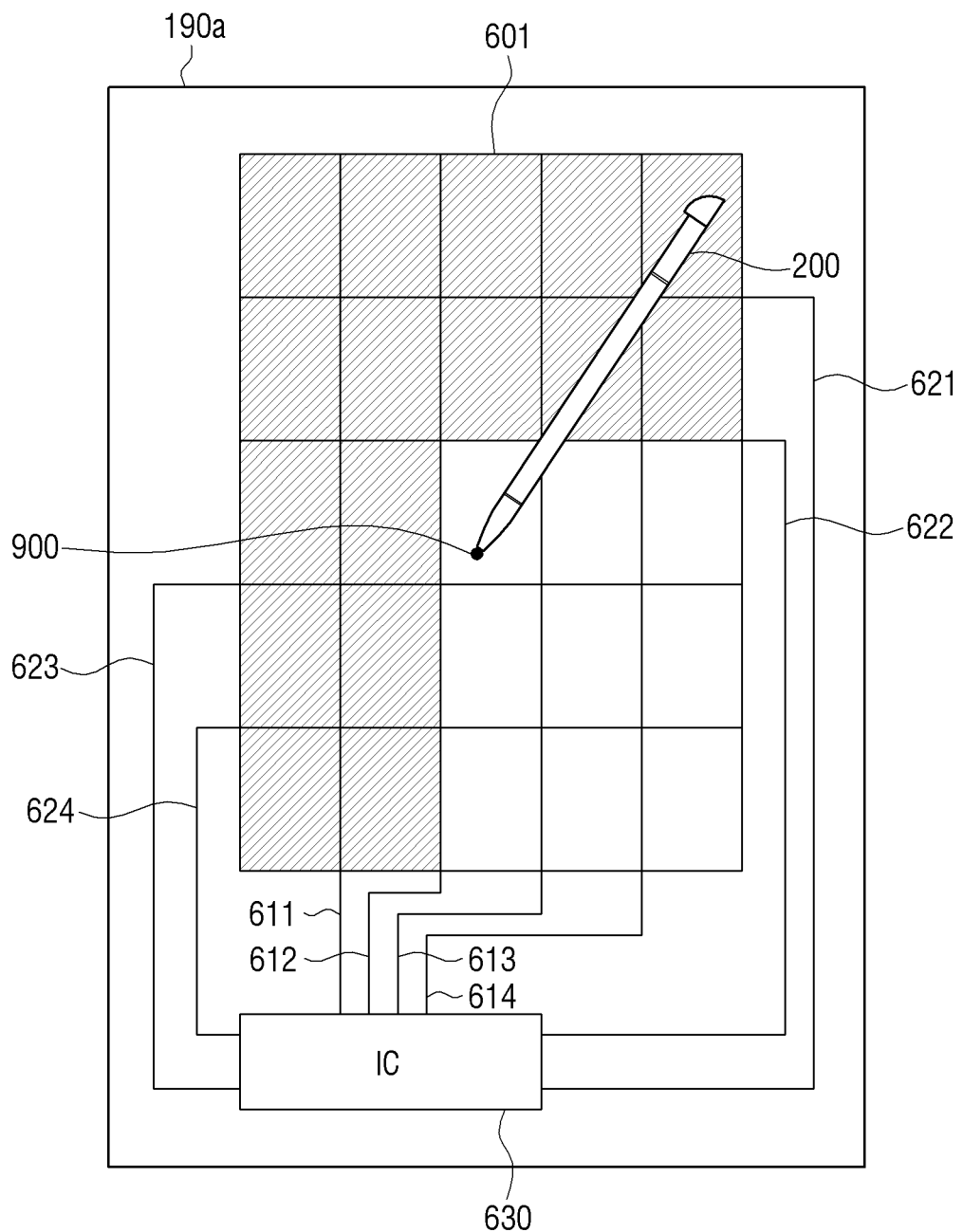

FIGS. 15 and 16 are diagrams of a controlling method according to an embodiment of the present disclosure.

Referring to FIG. 15, the coordinate indicating apparatus 200 may touch a first point 900 on the touchscreen 190. For example, if a user grips the coordinate indicating apparatus 200 with a right hand, it may be likely that a portion positioned in a preset region of the first point 900 is touched by the right hand of the user.

As illustrated in FIG. 16, the processor 110 may determine a hatched region as an activation region. The processor 110 may use only the signals output from the x-axis electrode wirings 611 and 612 and the y-axis electrode wirings 621 and 622 and may not use the signals output from the x-axis electrode wirings 613 and 614 and the y-axis electrode wirings 623 and 624.

As described above, only the portion that is likely to be touched by a user's hand may be deactivated so as to prevent a malfunction. Deactivation of the portion positioned in the present region of the first point 900 is exemplary and one of ordinary skill in the art may deactivate the portion that is likely to be touched by a user's hand using various methods in relation to a portion of the touchscreen 190 that is touched by the coordinate indicating apparatus 200.

Figure 17:
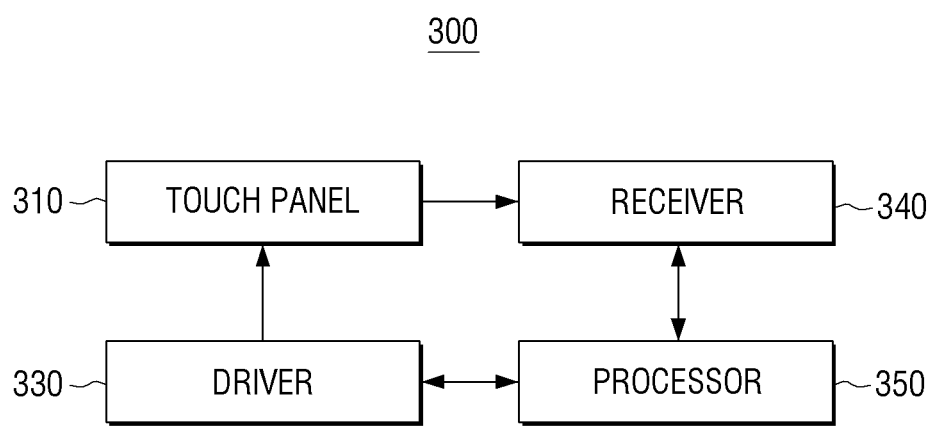
FIG. 17 is a block diagram of a coordinate measuring apparatus according to an embodiment of the present disclosure.

FIG. 17 is a block diagram of a coordinate measuring apparatus 300 according to an embodiment of the present disclosure.

Referring to FIG. 17, the coordinate measuring apparatus 300 may include a touch panel 310, a driver 330, a receiver 340, and a processor 350. The coordinate measuring apparatus 300, according to the present embodiment, may detect a position of the coordinate indicating apparatus 200 using an electrically coupled resonance (ECR) method.

The touch panel 310 may include a plurality of electrodes. In detail, the touch panel 310 may include a plurality of electrodes that are arranged in the form of a matrix. For example, the touch panel 310 may include a plurality of first electrodes arranged in a first direction and a plurality of second electrodes arranged in a second direction perpendicular to the first direction. The arrangement and operations of the plurality of electrodes included in the touch panel 310 are described below with reference to FIG. 18.

The driver 330 may generate a driving signal and provide the driving signal to a touch panel. In detail, the driver 330 may generate a first driving signal for detection of a hand touch and provide the signal to at least one of the electrodes of the touch panel 310. In this case, the first driving signal may have a driving frequency of 200 to 300 kHz.

Driving signals may be simultaneously provided to a plurality of electrodes for faster hand detection operations, and in this regard, if the same driving signal is provided to a plurality of electrodes, it may be impossible to identify an electrode from which a driving signal that causes a response signal to be received according to the driving signal is applied. Accordingly, the driver 330 may simultaneously provide different first driving signals to a plurality of electrodes. In detail, the driver 330 may provide the first driving signals with different digital codes to the plurality of electrodes. Here, a digital code may be a pulse signal having a binary number.

If an activation region/deactivation region is set according to a touch of the coordinate indicating apparatus 200, the driver 330 may not apply a first driving signal to an electrode corresponding to the deactivation region. For example, if the activation region is an upper end of the touch panel 310, the first driving signal may be applied only to an electrode of the corresponding upper end.

The driver 330 may generate a second driving signal for transmission to a resonance circuit of the coordinate indicating apparatus 200 that approaches the coordinate measuring apparatus 300 via capacitive coupling. In detail, if the coordinate indicating apparatus 200 is a stylus pen that operates in a passive manner, the driver 330 may apply a driving signal to electrodes in the touch panel 310 to transmit the driving signal to a resonance circuit of an object that approaches the coordinate measuring apparatus 300 via capacitive coupling.

In this case, the driver 330 may apply the same second driving signal in units of a plurality of electrodes with respect to electrodes in the touch panel 310 in order to transfer a significant amount of energy to the coordinate indicating apparatus 200 if possible. In this case, the second driving signal may be a signal of a different frequency band from the first driving signal and may have a driving frequency of about 500 kHz to 2 MHz.

For example, the driver 330 may collectively apply the same driving signal to all of a plurality of electrodes at a preset period unit, all of a plurality of electrodes that are arranged in the same direction, some adjacent electrodes among a plurality of electrodes that are arranged in the same direction, or two crossing electrodes. Such an applying method is merely an example, and thus, methods other than the aforementioned examples may be used as long as driving signals are simultaneously applied to two or more electrodes.

The aforementioned second driving signal may be a signal formed by filtering higher-order harmonics of a signal frequency (or a resonance frequency). In detail, an electronic device may restrict generation of unnecessary noise according to the electromagnetic interference (EMI) standard according to a frequency. In this case, if higher-order harmonics are filtered, high frequency noise may be reduced and, thus, it may be advantageous in terms of the EMI.

The receiver 340 may receive a first receiving signal for detecting a change in capacitance and receive a second receiving signal corresponding to a signal transmitted to the coordinate indicating apparatus 200. In this case, the receiver 340 may receive the second receiving signal after sequentially receiving all of the first receiving signals required to detect a hand position. In this case, if an activation region/deactivation region is set according to touch (or detection) of the coordinate indicating apparatus 200, the receiver 340 may receive only the first receiving signal of an electrode corresponding to the activation region and then receive the second receiving signal of all electrodes. As such, a receiving operation of the first receiving signal of some electrodes may be omitted so as to more rapidly perform an operation.

The receiver 340 may receive the first receiving signal from some of a plurality of electrodes and, simultaneously, may receive the second receiving signal from some of the other electrodes in plurality of electrodes. In detail, the receiver 340 may receive the first receiving signal from some of the plurality of electrodes to which the first driving signal is not applied and receive the second receiving signal from some of the other electrodes to which the first driving signal is not applied. A receiving operation of the receiver 340 is described below in detail with reference to FIGS. 19 to 21.

The processor 350 may determine at least one of a position of a hand and a position of the coordinate indicating apparatus 200 based on the received first receiving signal and the second receiving signal. In detail, the processor 350 may control the driver 330 to apply the first driving signal to some of the plurality of electrodes and control the receiver 340 to receive the first receiving signal from some of the remaining electrodes and to simultaneously receive the second receiving signal from some of the other remaining electrodes while the first driving signal is applied.

The processor 350 may calculate a capacitance between electrodes at intersections of a plurality of electrodes, which are formed between the electrodes, using the first receiving signal and determine a position of a hand based on the calculated capacitance.

The processor 350 may determine a position of the coordinate indicating apparatus 200 based on a ratio between the second receiving signals that are respectively received from the plurality of electrodes. For example, if the plurality of electrodes are arranged in the form of a matrix, a plurality of first electrodes are arranged in a first direction, and a plurality of second electrodes are arranged in a second direction perpendicular to the first direction, the processor 350 may determine a touch position of the second direction of the coordinate indicating apparatus 200 based on a ratio between the second receiving signals received from the first electrodes and determine a touch position of the first direction of the coordinate indicating apparatus 200 based on a ratio between the second receiving signals received from the second electrodes.

The processor 350 may detect a touch pressure of the coordinate indicating apparatus 200 based on a change of resonance frequency of the received second receiving signal or detect an operation mode of the coordinate indicating apparatus 200 based on a change of resonance frequency of the received second receiving signal.

The processor 350 may determine the activation region from which a hand position is detected, based on the second receiving signal. In detail, if the second receiving signal is not detected or a size of the received second receiving signal is less than or equal to a preset size and, thus, a position of the coordinate indicating apparatus 200 is not determined, the processor 350 may determine an entirety of the touch panel as the activation region. Upon detecting the second receiving signal to determine the position of the coordinate indicating apparatus 200, the processor 350 may determine only a preset region of the touch panel 310 as the activation region and determine the remaining region as the deactivation region.

In this case, the preset region may be a fixed region such as an upper region of the touch panel 310 as illustrated in FIG. 9 or may be a variable region corresponding to a position of the coordinate indicating apparatus 200.

If the preset region is the variable region, the processor 350 may determine a form of a user's grip on the coordinate indicating apparatus 200 and determine the activation region based on the determined form of the user's grip and the detected position of the coordinate indicating apparatus 200.

For example, if the determined form of the user's grip is a right-handed grip, the processor 350 may determine a left side or an upper-left side based on the detected position of the coordinate indicating apparatus 200 as the activation region. That is, a lower-right region that may be affected by a right hand gripping the coordinate indicating apparatus 200 may be determined as the deactivation region and the remaining region may be determined as the activation region.

In addition, if the determined form of the user's grip is a left-handed grip, the processor 350 may determine a right side or an upper-right side based on the detected position of the coordinate indicating apparatus 200 as the activation region. That is, a lower-left region that may be affected by a left hand gripping the coordinate indicating apparatus 200 may be determined as the deactivation region and the remaining region may be determined as the activation region.

Although the case in which a lower region is a region that may be affected by a gripping hand is described above, if the user grips the coordinate measuring apparatus 300 in a direction toward a lower portion from an upper portion of the coordinate measuring apparatus 300, the region that maybe affected by the hand may be an upper region. In this case, the aforementioned upper-right side or upper-left side may be changed to a lower-left side or a lower-right side to describe the case where an upper region may be affected by a hand. In addition, if a stylus pen is employed using this opposite method, the processor 350 may determine the activation region based on an arrangement between a position of the coordinate indicating apparatus 200 and a detected position of a user's touch.

The processor 350 may determine a form of a user's grip based on a detected position of a hand using the first receiving signal, which is described below with reference to FIGS. 22 and 23.

As described above, the coordinate measuring apparatus 300 according to an embodiment of the present disclosure may simultaneously receive a first receiving signal for detection of a position of a hand and a second receiving signal for detection of a position of a stylus pen so as to simultaneously measure the position of the hand and the position of the stylus pen at high speed.

As described above, if the coordinate measuring apparatus 300 according to an embodiment of the present disclosure uses the coordinate indicating apparatus 200, an activation region from which a user's touch is detectable may also be provided and, thus, a user may input various gestures using both a hand and a coordinate indicating apparatus 200. In addition, a position of a hand touch and a position of the coordinate indicating apparatus 200 may be detected using only one panel and, thus, only a small installment space may be required and costs may be reduced as compared to a case in which two types of touch panels are used.

Although only basic components of the coordinate measuring apparatus 300 are described above, the coordinate measuring apparatus 300 may further include various components described with reference to FIG. 2.

Figure 18:
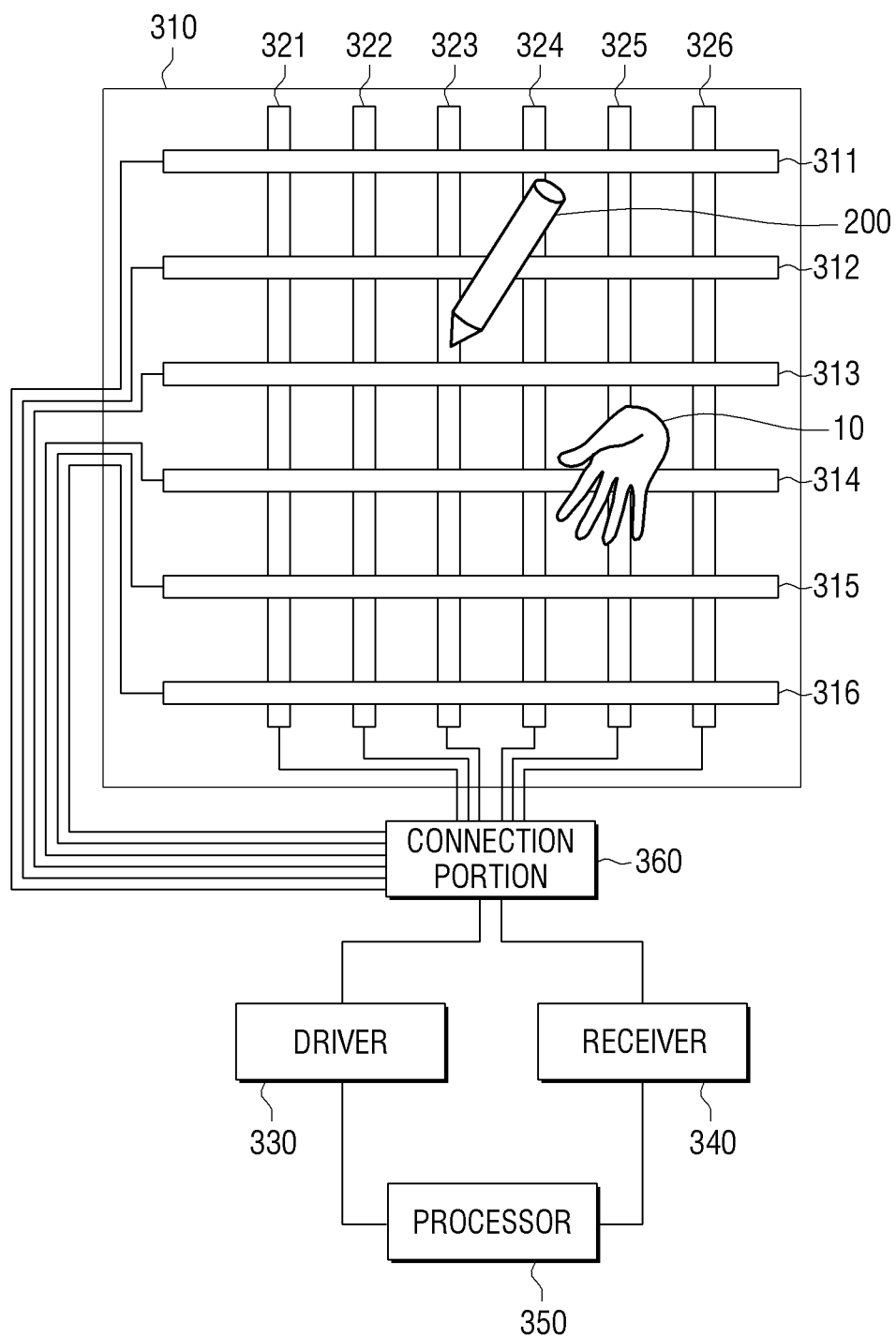
FIG. 18 is a diagram of the coordinate measuring apparatus of FIG. 17 according to an embodiment of the present disclosure.

FIG. 18 is a diagram of the coordinate measuring apparatus 300 of FIG. 17 according to an embodiment of the present disclosure.

Referring to FIG. 18, the coordinate measuring apparatus 300 may include the touch panel 310, the driver 330, the receiver 340, the processor 350, and a connection portion 360.

The touch panel 310 may include a plurality of electrodes. In detail, as illustrated in FIG. 3, the touch panel 310 may include a first electrode group and a second electrode group that are arranged in different directions.

The first electrode group may include a plurality of first electrodes 311, 312, 313, 314, 315, and 316 that are each arranged in a first direction (e.g. a horizontal direction). In this case, the first electrode may be a transparent electrode that is formed of ITO material. Each of the plurality of first electrodes 311, 312, 313, 314, 315, and 316 in the first electrode group may be an electrode for transmitting a first driving signal during detection of a position of a finger.

The second electrode group may include a plurality of second electrodes 321, 322, 323, 324, 325, and 326 that are each arranged in a second direction (e.g. a vertical direction). In this case, the second electrode may be a transparent electrode that is formed of an ITO material. Each of the plurality of second electrodes 321, 322, 323, 324, 325, and 326 in the second electrode group may be an electrode for receiving a first receiving signal caused by the first driving signal input from the first electrode during detection of a position of a finger.

Although an example in which each electrode group includes only six electrodes is illustrated, the present disclosure is not limited thereto. For example, seven or more electrodes or five or less electrodes may be used. Although electrodes in each electrode group are each shaped like a simple rectangular in the illustrated example, the present disclosure is not limited thereto. For example, each electrode may be shaped with a different and/or more complex shape.

The driver 330 may apply a first driving signal and/or a second driving signal to the touch panel 310 at a predetermined time point. A detailed description of an operation of the driver 330 is provided above, with reference to FIG. 17 and, thus, a repeat of the description is not provided here.

The receiver 340 may receive the first receiving signal and the second receiving signal. In detail, the receiver 340 may sequentially receive the second receiving signal after receiving the first receiving signal or may simultaneously receive the first receiving signal and the second receiving signal. The operation of sequentially receiving the first receiving signal and the second receiving signal is not provided here, and thus, the operation of simultaneously receiving the first receiving signal and the second receiving signal is described below.

In detail, the receiver 340 may receive first receiving signals from the second electrode in parallel in a plurality of channel units (e.g. three channels) and receive second receiving signals from each of the first electrode and the second electrode in parallel in a plurality of channel units. A configuration and operation of the receiver 340 are described below in detail with reference to FIGS. 18 to 21.

The receiver 340 may perform various signal processing operations on the received first receiving signal and the second receiving signal. For example, the receiver 340 may amplify each received signal using an amplifier.

The connection portion 360 may selectively connect each electrode in the touch panel 310 to the driver 330 or the receiver 340. The operation of the connection portion 360 may be performed under control of the processor 350 as described below and may also be performed under control of each of the driver 330 and the receiver 340. The connection portion 360 may be embodied using a plurality of switch elements.

The processor 350 may control the driver 330 and the receiver 340 to simultaneously measure the first receiving signal corresponding to the detection of a hand and the second receiving signal corresponding to the detection of the coordinate indicating apparatus 200 so as to simultaneously detect a hand and a position of the coordinate indicating apparatus 200. The processor 350 may be embodied as a CPU, a microprocessor, an application specific integrated circuit (ASIC), or the like. According to an embodiment of the present disclosure, although the case in which only one processor is used is described above, a plurality of processors may be used in order to embody a function according to the present disclosure.

For example, the processor 350 may control the driver 330 to apply the first driving signal (e.g. digital codes of driving signals applied to respective first electrodes have different values) to a first sub group 311, 312, and 313 of the first electrode group in a first time period and control the receiver 340 to receive the first receiving signal from some electrodes 321, 322, and 323 of the second electrode group and to simultaneously receive the second receiving signal in a second sub group 314, 315, and 316 of the first electrode group during application of the first driving signal.

Then, the processor 350 may control the driver 330 to continuously apply the first driving signal to the first sub group 311, 312, and 313 of the first electrode group for a second time period and control the receiver 340 to receive the first receiving signal from some of the other electrodes 324, 325, and 326 and to simultaneously receive the second receiving signal from some electrodes 321, 322, and 323 of the second electrode group during application of the first driving signal.

Then, the processor 350 may control the driver 330 to apply the first driving signal to the second sub group 314, 315, and 316 of the first electrode group for a third time period and control the receiver 340 to receive the first receiving signal from some electrodes 321, 322, and 323 of the second electrode group and to simultaneously receive the second receiving signal from some of the other electrodes 324, 325, and 326 of the second electrode group during application of the first driving signal.

Then, the processor 350 may control the driver 330 to continuously apply the first driving signal to the second sub group 314, 315, and 316 of the first electrode group for a fourth time period and control the receiver 340 to receive the first receiving signal from some of the other electrodes 324, 325, and 326 of the second electrode group and to simultaneously receive the second receiving signal from the first sub group 311, 312, and 313 of the first electrode group during application of the first driving signal.

Through this operation, the first receiving signals required to detect a hand position and the second receiving signals received from all electrodes required to detect a position of the coordinate indicating apparatus 200 may be received.

In addition, upon receiving the first receiving signal of all the second electrodes, the processor 350 may calculate a capacitance at a plurality of electrode intersections formed between the first electrode and the second electrode and determine a hand position based on the calculated capacitance.

For example, the processor 350 may calculate a capacitance based on a change in the first receiving signals received from each of the second electrodes during the first to fourth time periods, determine a Y coordinate corresponding to the first electrode 314 with the largest change in the calculated capacitance as a Y coordinate of a hand, calculate a capacitance based on a change in the first receiving signal, and determine an X coordinate corresponding to the second electrode 325 with the largest change in the calculated capacitance as an X coordinate of a hand.

Upon receiving the second receiving signals of all electrodes, the processor 350 may determine a position of the coordinate indicating apparatus 200 based on a ratio between the second receiving signals respectively received from the plurality of first electrode 311, 312, 313, 314, 315, and 316 and a ratio between the second receiving signals respectively received from the plurality of second electrodes 321, 322, 323, 324, 325, and 326.

For example, if a size of the second receiving signal of the first electrode 313 is greater than a size of the second receiving signal of another of the first electrodes 311, 312, 314, 315, and 316 and a size of a response signal of the second electrode 323 is greater than a size of the second receiving signal of another of the second electrodes 321, 322, 324, 325, and 326, the processor 350 may determine a second direction touch position of the coordinate indicating apparatus 200 from a ratio between the second receiving signals received from the first electrodes 312, 313, and 314 and determine a touch position in the first direction of the coordinate indicating apparatus 200 from a ratio between the second receiving signals received from the second electrodes 322, 323, and 324.

Even if a deactivation region is set, a hand position may be calculated using the method described above, and upon determining that the hand position is placed in the deactivation region, the processor 350 may not use the corresponding position. In this case, the aforementioned operation of simultaneously receiving the first receiving signal and the second receiving signal may be used without changes.

If a deactivation region is set, the processor 350 may not calculate a capacitance of intersections of electrodes corresponding to the deactivation region during a calculation of a capacitance of the aforementioned electrode. In this case, the aforementioned operation of simultaneously receiving the first receiving signal and the second receiving signal may be used without changes.

If a deactivation region is set, the processor 350 may control the receiver 340 so as not to receive the first receiving signal of the deactivation region. The processor 350 may not provide the first driving signal of the deactivation region. In this case, the aforementioned operation of simultaneously receiving the first receiving signal and the second receiving signal may be changed and applied, which is described below with reference to FIGS. 19 to 21.

Although FIG. 18 illustrates a case in which a plurality of electrodes is arranged in the form of a matrix, the present disclosure is not limited thereto, and the electrodes may be arranged in other forms other than a matrix.

Figure 19:
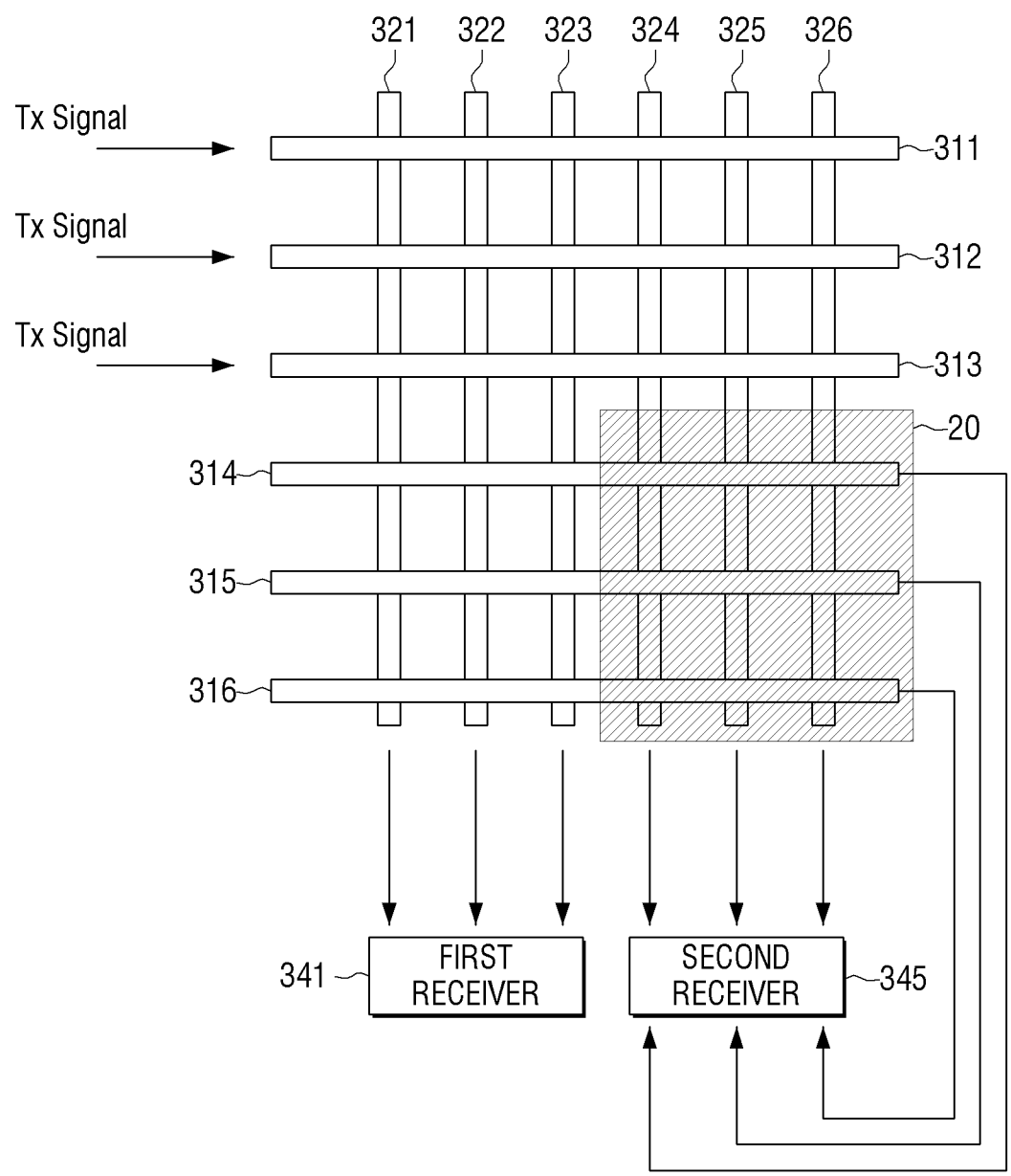
FIGS. 19 to 21 are diagrams of a controlling method according to an embodiment of the present disclosure.
Figure 20:
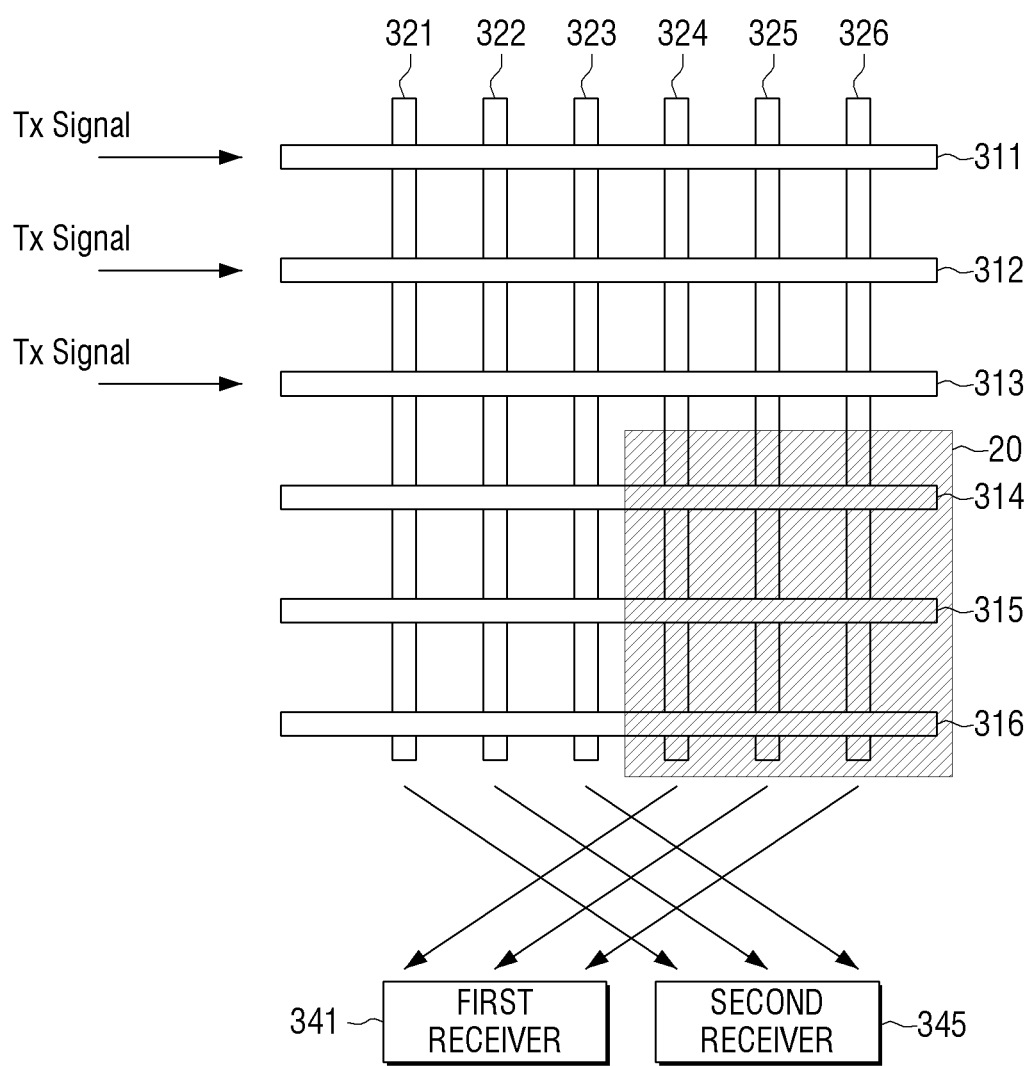
Figure 21:
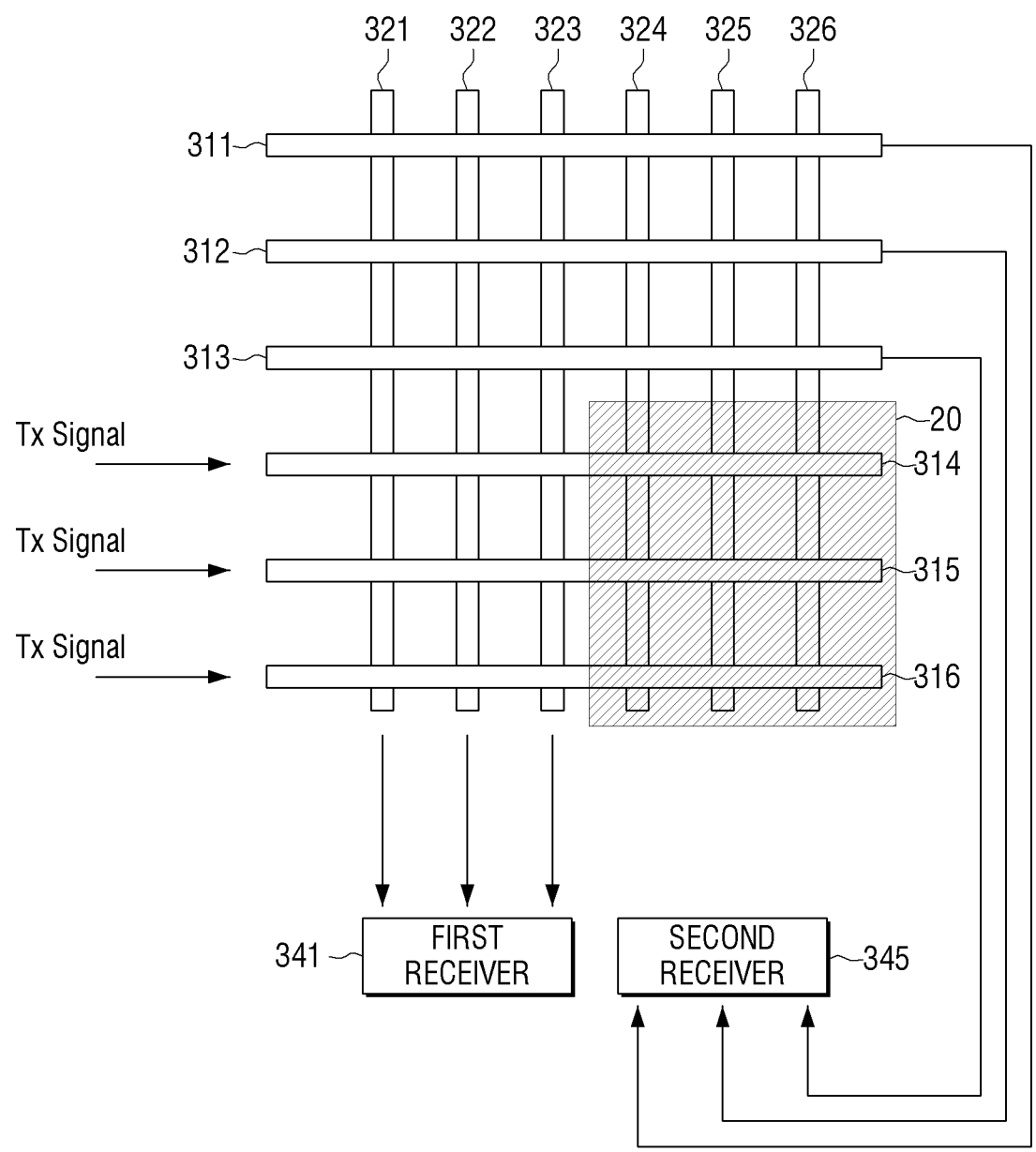

FIGS. 19 to 21 are diagrams of a controlling method according to an embodiment of the present disclosure. For the descriptions of FIGS. 19 to 21 provided below, it is assumed that the coordinate indicating apparatus 200 is positioned at a lower-right side 20 of the touch panel 310 and, thus, only an upper region of the touch panel 310 is set as a preset activation region. However, the present disclosure is not limited thereto, and the coordinate indicating apparatus 200 may be positioned at any suitable location.

Referring to FIG. 19, the first electrode group includes a plurality of first electrodes 311, 312, 313, 314, 315, and 316 that may be divided into a plurality of sub groups in a plurality of electrode units that are consecutively arranged. For example, the first electrode group may be divided into a first sub group 311, 312, and 313 and a second sub group 314, 315, and 316.

A first receiver 341 may receive a first receiving signal for detecting a hand. In detail, the first receiver 341 may receive the first receiving signal from the plurality of second electrodes in a plurality of channel units in parallel. For example, the first receiver 341 may alternately receive the first receiving signal from some electrodes 321, 322, and 323 of the second electrodes and some other electrodes 324, 325, and 326 of the second electrodes. The first receiver 341 may alternately receive the first receiving signal from some electrodes 321, 323, and 325 of the second electrodes and some other electrodes 322, 324, and 326 of the second electrodes.

A second receiver 345 may receive a second receiving signal for detecting the coordinate indicating apparatus 200. In detail, the second receiver 345 may receive the second receiving signal from each of the plurality of first electrodes and second electrodes. In this case, the second receiver 345 may receive the second receiving signal from an electrode to which the first driving signal is not applied and from which the first receiver 341 does not receive the first receiving signal.

In this case, the driver 330 may apply the first driving signal (Tx signal) to the first sub group 311, 312, and 31 of the first electrode group. In detail, digital codes of driving signals applied to respective first electrodes may have different values. In this case, the first sub group 311, 312, and 313 may be an electrode corresponding to the aforementioned preset region (e.g. an activation region).

The first receiver 341 may receive the first receiving signal from some electrodes 321, 322, and 323 of the second electrode group during application of the first driving signal.

Simultaneously, the second receiver 345 may receive the second receiving signals from the second sub group 314, 315, and 316 of the first electrode group and some electrodes 324, 325, and 326 of the second electrode.

Referring to FIG. 20, the processor 350 may control the driver 330 to continuously apply the first driving signal to the first sub group 311, 312, and 313 of the first electrode group.

The first receiver 341 may receive the first receiving signal from some of the other electrodes 324, 325, and 326 of the second electrodes during application of the first driving signal.

The second receiver 345 may receive the second receiving signal from some electrodes 321, 322, and 323 of the second electrode group.

Referring to FIG. 21, the driver 330 may terminate an operation of applying a driving signal. The first receiver 341 may also terminate an operation of receiving the first receiving signal.

The second receiver 345 may receive the second receiving signal from the first sub group 311, 312, and 313b of the first electrode group.

Through the operation illustrated in FIGS. 19 to 21, the first receiver 341 may receive the first receiving signal required to calculate a capacitance of interactions between some first electrodes 311, 312, and 313 of the first electrode group and all the second electrodes 321, 322, 323, 324, 325, and 326 of the second electrode group, and the second receiver 345 may receive the second receiving signals of all of the first electrodes 311, 312, 313, 314, 315, and 316 of the first electrode group and all of the second electrodes 321, 322, 323, 324, 325, and 325 of the second electrode group.

Accordingly, the processor 350 may calculate only a capacitance at intersections of the aforementioned received three first electrodes and six second electrodes to determine a position of a hand in the activation region.

Although the case in which a sub group is pre-divided is described above, a sub group may be dynamically varied. In addition, although the case in which electrodes in each sub group are continuously arranged is described above, sub groups may be arranged to cross each other. For example, a first sub group 311, 313, and 315 of the first electrode group and a second sub group 312, 314, and 316 of the first electrode group may be differentiated.

Figure 22:
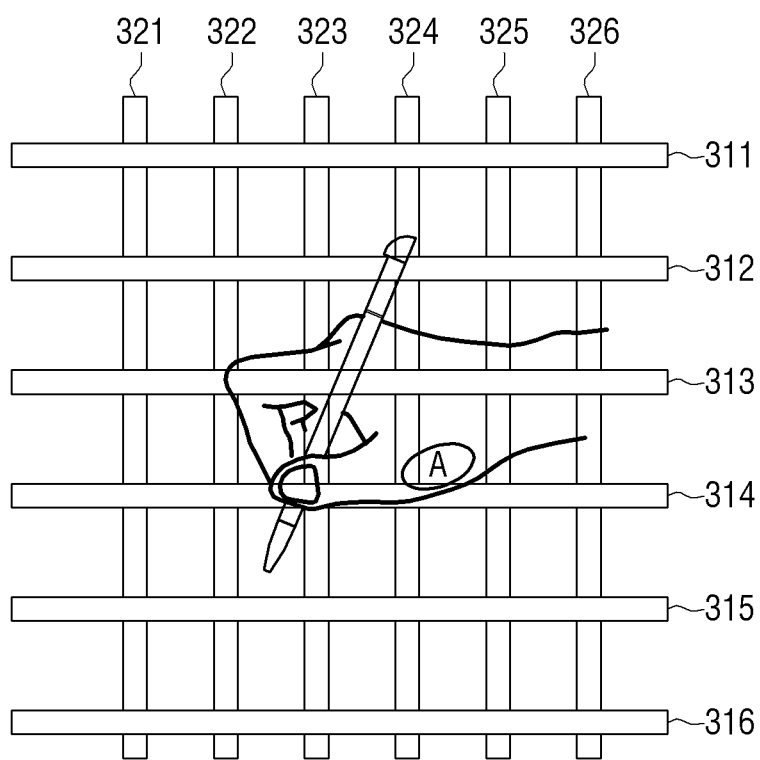
FIGS. 22 to 23 are diagrams of a controlling method according to an embodiment of the present disclosure.
Figure 23:
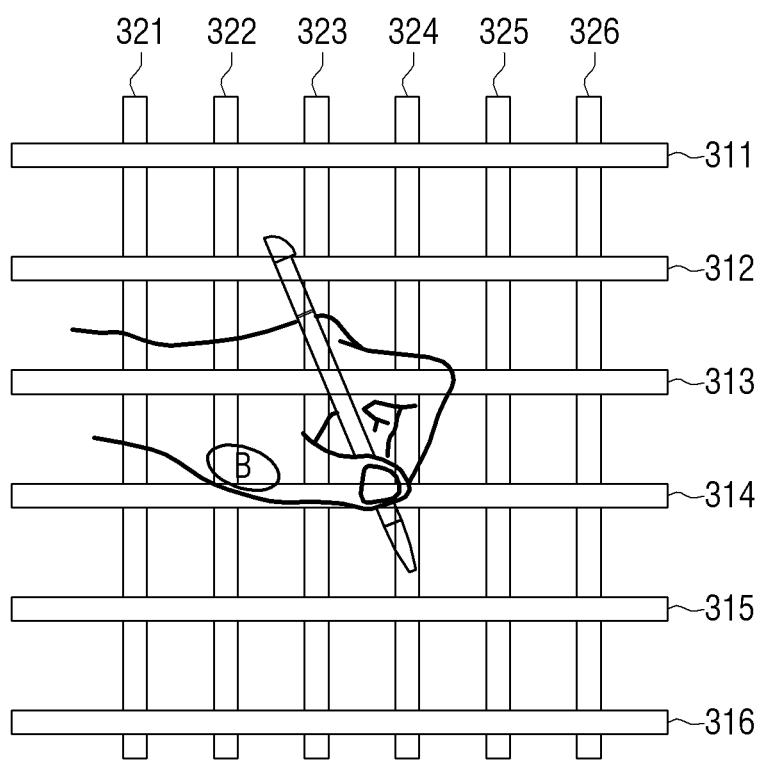

FIGS. 22 to 23 are diagrams of a controlling method according to an embodiment of the present disclosure.

In detail, FIG. 22 illustrates a case in which a right-handed user grips the coordinate indicating apparatus 200 and inputs a coordinate and FIG. 23 illustrates a case in which a left-handed user grips the coordinate indicating apparatus 200 and inputs a coordinate.

Referring to FIG. 22, in the case of a right-handed user, a palm of the user may be positioned in a right region A of the coordinate indicating apparatus 200. Accordingly, upon detecting a relatively wide user touch in a right region of the coordinate indicating apparatus 200, the processor 350 may determine that the user is right-handed. Accordingly, upon detecting the coordinate indicating apparatus 200, the processor 350 may set a lower-right region based on a position of the coordinate indicating apparatus 200 as a deactivation region and set the remaining region as an activation region.

Referring to FIG. 23, in a case of a left-handed user, a palm of the user may be positioned in a left region B of the coordinate indicating apparatus 200. Accordingly, upon detecting a relatively wide user touch in a left region of the coordinate indicating apparatus 200, the processor 350 may determine that the user is left-handed. Accordingly, upon detecting the coordinate indicating apparatus 200, the processor 350 may set a lower-left region based on a position of the coordinate indicating apparatus 200 as a deactivation region and set the remaining region as an activation region.

Although a case in which it is determined whether a user is right-handed or left-handed based on a first receiving signal is described above, the present disclosure is not limited thereto, and whether a user is a right-handed or left-handed may be set through a user interface (UI) and the aforementioned activation and deactivation regions may be set based on a set value.

Figure 24:
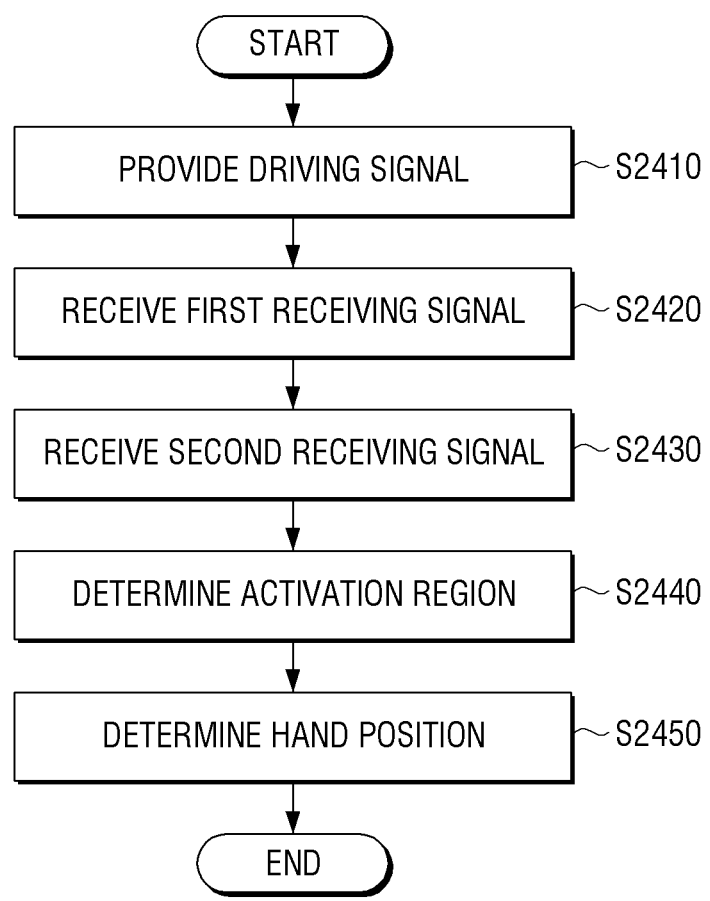
FIG. 24 is a flowchart of a controlling method according to an embodiment of the present disclosure.

FIG. 24 is a flowchart of a controlling method according to an embodiment of the present disclosure.

Referring to FIG. 24, a driving signal may be generated and provided to a touch panel at step S2410. In detail, a first driving signal for detecting a touch of a hand may be provided to the touch panel.

A first receiving signal for detecting a change in capacitance may be received from the touch panel at step S2420.

A second receiving signal corresponding to a signal transmitted from the coordinate indicating apparatus 200 may be received at step S2430. Reception of the second receiving signal may be performed after the aforementioned reception of the first receiving signal or may be performed simultaneously during the aforementioned reception of the first receiving signal.

An activation region from which a position of a hand is to be detected may be determined based on the second receiving signal at step S2440. In detail, if a second receiving signal is not received or only a second receiving signal of a preset size or less is received, it may be determined that a coordinate indicating apparatus 200 is not positioned and the entirety of the touch panel may be determined as an activation region. If the second receiving signal is received and has a preset size or more, it may be determined that the coordinate indicating apparatus 200 is positioned, only a preset region of the touch panel may be determined as an activation region, and the remaining region may be determined as the deactivation region. A position of the coordinate indicating apparatus 200 may be determined based on the received second receiving signal. The preset region may be an upper region of the touch panel and may be a region that is varied based on a position of the coordinate indicating apparatus 200.

A position of a hand may be determined in the determined activation region at step S2450.

As described above, in the controlling method of the coordinate measuring apparatus 300 according to an embodiment of the present disclosure, if a coordinate indicating apparatus 200 is used, an activation region from which a user's touch is detectable may also be provided and, thus, the user may input various gestures using both a hand and the coordinate indicating apparatus 200. Detection of a touch of a hand may be deactivated with respect to a partial region, and thus, a touch error due to gripping the coordinate measuring apparatus 300 may be avoided. The method of FIG. 24 may be performed on the coordinate measuring apparatus 100, 300 of FIG. 2 or 17 and may be performed on a coordination measuring apparatus 100, 300 including other components.

The aforementioned controlling method may be embodied as a program executable in the coordinate measuring apparatus 100, 300 and stored and provided in a non-transitory computer readable recording medium. The program may be stored in a separate device such as a server and downloaded and installed in the coordinate measuring apparatus 300.

The non-transitory computer readable recording medium may be a medium which does not store data temporarily such as a register, a cache, and memory, but stores data semi-permanently and is readable by devices.

The foregoing embodiments are merely exemplary and are not intended to be construed as limiting the present disclosure. The present disclosure may be readily applied to other types of apparatuses. Also, the description of each embodiment of the present disclosure is illustrative, and is not intended to limit the scope of the present disclosure, and many alternatives, modifications, and variations will be apparent to those skilled in the art. It is intended that the present disclosure includes all alternatives, modifications, and variations of the present disclosure that are within the scope of the present disclosure as defined by the appended claims and their equivalents.

What is claimed is:

1. A coordinate measuring apparatus, comprising:
    a touch panel comprising a plurality of electrodes;
    a driver configured to generate a driving signal and to provide the driving signal to the touch panel;
    a receiver configured to receive from the touch panel a first receiving signal and a second receiving signal corresponding to a signal transmitted from a coordinate indicating apparatus; and
    a processor configured to:
       identify a form of a user's grip on the coordinate indicating apparatus based on the first receiving signal; and
       identify an activation region and a deactivation region of the touch panel based on the identified form of the user's grip, the second receiving signal, and a history of identification of the form of the user's grip.

2. The coordinate measuring apparatus of claim 1, wherein the processor is configured to identify whether a hand gripping the coordinate indicating apparatus is a left hand or a right hand based on the form of the user's grip and the second receiving signal.

3. The coordinate measuring apparatus of claim 2, wherein the processor is configured to:

based on the form of the user's grip being a right-handed grip, identifying a left side or an upper-left side of the touch panel with reference to a position corresponding to the second receiving signal as the activation region and a remaining region as the deactivation region, and based on the form of the user's grip being a left-handed grip, identifying a right side or an upper-right side of the touch panel with reference to a position corresponding to the second receiving signal as the activation region and a remaining region as the deactivation region.

4. The coordinate measuring apparatus of claim 1, wherein the processor is configured to provide a user interface (UI) for setting the form of the user's grip, and identify the form of the user's grip based on a user input regarding the UI.

5. The coordinate measuring apparatus of claim 1, wherein the processor is configured to identify at least one of a touch signal and the second receiving signal in the activation region, and identify the second receiving signal in the deactivation region, wherein the touch signal is different from the first receiving signal according to the form of the user's grip.

6. The coordinate measuring apparatus of claim 5, wherein the processor is configured to, based on the touch signal being identified in the deactivation region, ignore the touch signal, and based on the second receiving signal being identified in the deactivation region, re-identify the activation region and the deactivation region.

7. The coordinate measuring apparatus of claim 1, wherein the processor is configured to identify the activation region and the deactivation region of the touch panel based on a history of the second receiving signal.

8. A method of controlling a coordinate measuring apparatus comprising a touch panel, comprising:

generating, by a driver, a driving signal and providing the driving signal to at least one of a plurality of electrodes of the touch panel;

receiving, by a receiver, a first receiving signal;

receiving, by the receiver, a second receiving signal, through at least one of the plurality of the electrodes, corresponding to a signal transmitted from a coordinate indicating apparatus;

identifying, by a processor, a form of a user's grip on the coordinate indicating apparatus based on the first receiving signal; and identifying, by the processor, an activation region and a deactivation region of the touch panel based on the identified form of the user's grip, the second receiving signal, and a history of identification of the form of the user's grip.

9. The method of claim 8, wherein identifying, by the processor, the form of the user's grip comprises identifying whether a hand gripping the coordinate indicating apparatus is a left hand or a right hand based on the form of the user's grip and the second receiving signal.

10. The method of claim 9, wherein identifying, by the processor, the activation region and the deactivation region comprises, based on the form of the user's grip being a right-handed grip, identifying a left side or an upper-left side of the touch panel with reference to a position corresponding to the second receiving signal as the activation region and a remaining region as the deactivation region, and based on the form of the user's grip being a left-handed grip, identifying a right side or an upper-right side of the touch panel with reference to a position corresponding to the second receiving signal as the activation region and a remaining region as the deactivation region.

11. The method of claim 8, further comprising providing a user interface (UI) for setting the form of the user's grip, and identify the form of the user's grip based on a user input regarding the UI.

12. The method of claim 8, further comprising identifying at least one of a touch signal and the second receiving signal in the activation region, and identify the second receiving signal in the deactivation region, wherein the touch signal is different from the first receiving signal according to the form of the user's grip.

13. The method of claim 12, further comprising, based on the touch signal being identified in the deactivation region, ignoring the touch signal, and based on the second receiving signal being identified in the deactivation region, re-identifying the activation region and the deactivation region.

14. The method of claim 8, wherein identifying, by the processor, the activation region and the deactivation region comprises, identifying the activation region and the deactivation region of the touch panel based on a history of the second receiving signal.

* * * * *